United States Patent
K et al.

(10) Patent No.: US 8,121,407 B1
(45) Date of Patent: Feb. 21, 2012

(54) METHOD AND APPARATUS FOR LOCALIZED LABELING IN DIGITAL IMAGES

(75) Inventors: Balaji K, Noida (IN); Anubha Rastogi, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 770 days.

(21) Appl. No.: 12/201,333

(22) Filed: Aug. 29, 2008

Related U.S. Application Data

(60) Provisional application No. 61/037,226, filed on Mar. 17, 2008.

(51) Int. Cl.
*G06K 9/34* (2006.01)
(52) U.S. Cl. .................. 382/173; 382/175; 382/180
(58) Field of Classification Search .................. None
See application file for complete search history.

(56) References Cited

U.S. PATENT DOCUMENTS

| | | |
|---|---|---|
| 6,744,923 B1 | 6/2004 | Zabih et al. |
| 2006/0291721 A1 | 12/2006 | Torr et al. |
| 2007/0165949 A1 | 7/2007 | Sinop et al. |

OTHER PUBLICATIONS

Boykov, Y.Y.; Jolly, M.-P. "Interactive graph cuts for optimal boundary & region segmentation of objects in N-D images". Eighth IEEE International Conference on Computer Vision, ICCV 2001, vol. 1, pp. 105-112.*
Herve Lombaert, Yiyong Sun, Leo Grady, Chenyang Xu, "A Multi-level Banded Graph Cuts Method for Fast Image Segmentation," IEEE International Conference on Computer Vision, vol. 1, pp. 259-265, 2005.*
Liu, Yu; Veksler, Olga; Juan, Oliver; "Simulating Classic Mosaics with Graph Cuts, Energy Minimization Methods in Computer Vision and Pattern Recognition," pp. 55-70, Aug. 14, 2007.
Sudipta N Sinha, "Graph Cut Algorithms in Vision, Graphics and Machine Learning", Integrative Paper, Nov. 2004, UNC Chapel Hill.

* cited by examiner

*Primary Examiner* — Samir Ahmed
*Assistant Examiner* — Li Liu
(74) *Attorney, Agent, or Firm* — Robert C. Kowert; Meyertons, Hood, Kivlin, Kowert & Goetzel, P.C.

(57) ABSTRACT

Methods and apparatus for localized labeling in digital images. A region is obtained within which a global labeling solution for an image lies. The region is covered with a set of multiple overlapping tiles. A labeling function is applied to each tile in two or more subsets of the tiles to generate a local labeling for each of the tiles in the subsets. The local labeling for tiles in a first subset are input as a boundary condition to the labeling function when applied to overlapping tiles in a second subset. The local labelings for all of the tiles in all of the subsets are merged to form a global labeling for the image. The labeling function may be executed in parallel on two or more of the tiles.

47 Claims, 15 Drawing Sheets

METHOD AND APPARATUS FOR LOCALIZED LABELING IN DIGITAL IMAGES

PRIORITY INFORMATION

This application claims benefit of priority of U.S. Provisional Application Ser. No. 61/037,226 entitled "Method and Apparatus for Localized Hierarchical Graph Cuts for Image Segmentation" filed Mar. 17, 2008, the content of which is incorporated by reference herein in its entirety.

BACKGROUND

Description of the Related Art

In computer vision, computer graphics and computational photography, pixel labeling or just labeling, refers to assigning one of two or more labels to pixels in a digital image or region of an image. Generally, a labeling function of some type is applied to the image or region that examines pixels in the image or region and assigns one of the two or more labels to at least some of the pixels examined. Conventionally, a labeling problem that has two labels is referred to as a bi-label problem, while a labeling problem with more than two labels is referred to as a multi-label problem. An example of labels that may be applied in a bi-label problem would be a foreground label and a background label. A labeling function may be applied to an image that applies a foreground label or a background label to pixels that lie in a specified foreground according to the color (e.g., RGB value), intensity, or some other metric of the pixel. Various data structures or methods may be used to record the labels for the pixels in an image or region. An example of a data structure that may be used is a mask. An exemplary mask is the bit mask, which may be used in particular for recording the labels in a bi-label problem. In a bit mask, each bit corresponds to a pixel in the image or region, 1 is used to indicate one label, and 0 is used to indicate the other label. A similar mask data structure to the bit mask may be used for multi-label problems in which two or more bits in the mask correspond to a pixel in the image or region.

There are many possible applications of labeling to problems in computer vision, computer graphics and computational photography. An exemplary labeling algorithm that may be used in computer vision, computer graphics and computational photography is graph cut labeling. Despite the high quality labeling that graph cut-based methods may provide, scalability issues have prevented graph cut-based methods from being deployed for widespread consumer usage. If the graph under consideration has v vertices and each vertex has n neighbors, solving the graph cut problem using a typical, conventional augmenting path based max-flow algorithm requires $O(nv)$ memory and $O(nv^3)$ time. If the algorithm is run on large images, which are becoming increasingly common, this complexity overwhelms the resources of most normal machines.

There have been two approaches to reduce the complexity of graph cut labeling. One is to reduce the total number of vertices, and the other is to reduce the number of augmenting paths. The hierarchical graph cuts technique is an example of vertex reduction optimization. In this method, the graph cut problem is solved first on a low-resolution version of the image. The cut is then upsampled to the high-resolution image and a region, or band, of uncertainty is drawn around it. Finally the graph cut is performed on the band of uncertainty. This technique typically reduces the number of vertices from v to $O(\sqrt{v})$. An example of augmenting path reduction technique is the flow recycling method.

Even though the above conventional methods may produce some improvement in speed to graph cut labeling, these methods typically fall short of providing what is generally considered a fast response. As a result, various other approximations such as pre-segmenting, using very thin bands, or even simply performing the graph cut at an intermediate resolution and upsampling the result have been used. However, these approximations tend to produce significantly lower quality segmentation than is typically desired. Further, similar complexity and performance issues may also be present in other labeling algorithms than graph cut labeling.

SUMMARY

Various embodiments of a method and apparatus for localized labeling in digital images are described. In embodiments, a region is obtained within which a global labeling solution for an image lies. The region is covered with a set of multiple overlapping tiles. A labeling function is applied to each tile in a first subset of the tiles to generate a local labeling for each of the tiles in the first subset. The labeling function is then applied to each tile in a second subset of the tiles to generate a local labeling for each of the tiles in the second subset. The local labeling for tiles in the first subset are input as a boundary condition to the labeling function when applied to overlapping tiles in the second subset. The local labelings for all of the tiles in all of the subsets are merged to form a global labeling for the image. Since embodiments subdivide the labeling problem so that the labeling function may be applied locally to non-overlapping tiles in different subsets, the labeling function may be performed in parallel for two or more of the tiles.

Embodiments may be applied, for example, to generate graph cuts for image segmentation. Embodiments may be applied to either or both bi-label and multi-label graph cut labeling problems. While embodiments are generally described in respect to applications of graph cut labeling to generate graph cuts for image segmentation, embodiments may be applied in other applications for labeling in computer vision, computer graphics and computational photography.

Embodiments may provide a low memory, parallelizable implementation of graph cut-based image segmentation. In embodiments, the segmentation problem is solved using a technique of hierarchical graph cuts wherein the problem is first solved on a low-resolution version of the image, and then the low-resolution solution is upsampled to obtain a narrow band of uncertainty in the high-resolution image within which the high-resolution graph cut would lie. The narrow band is then subdivided into overlapping regions, referred to herein as tiles, and the graph cut segmentation problem is solved for each of the tiles separately. The overlapping tiles may be used to provide boundary conditions that force the cut to be continuous.

Embodiments may divide a graph cut problem into small manageable pieces (referred to as regions or tiles), and solve the graph cut labeling for each tile independently. That is, the labeling of each pixel is determined using local (to the tile) information only. While the graph cut labeling is solved for each tile independently, the tiles may be selected so as to overlap other tiles. Thus, a graph cut solution for one tile may be used as a boundary condition for another tile when solving for a graph cut solution for the other tile. If the pieces are chosen well, putting together these localized solutions may yield a labeling that is very close to the global minimum. Since the problem is subdivided into several pieces, the number of vertices dealt with at a time (and hence the memory required) is greatly reduced, and a significant speedup may be realized due to cache friendliness. The approach is also amenable to parallelization. Thus, embodiments may exploit the trend in processor design towards multiple cores and software deployment on clusters.

In one embodiment, an image to be segmented is obtained. Graph cut labeling is performed on a low-resolution version of the image to find a low-resolution graph cut. Upsampling from the low-resolution graph cut to the high-resolution image may be performed to obtain a "fuzzy" region or band of uncertainty within which the high-resolution graph cut would lie. The band of uncertainty may be subdivided into a set of overlapping tiles. In one embodiment, to subdivide the band of uncertainty into a set of overlapping tiles, the low-resolution graph cut may be overlaid with a set of overlapping tiles. The low-resolution tiles may then be upsampled from the high-resolution image to form the set of overlapping tiles on the high-resolution image within which the high-resolution graph cut would lie. In other embodiments, other methods may be used to generate the set of overlapping tiles. In one embodiment, an intermediate image, i.e. an image that is intermediate in size between the low-resolution image on which the graph cut labeling is performed to generate the low-resolution graph cut, may be used to subdivide the band of uncertainty into a set of overlapping tiles.

The set of overlapping tiles may then be subdivided into non-overlapping subsets. A non-overlapping subset is a subset of tiles in which no two tiles in the subset overlap. However, the tiles will overlap tiles in other subset(s). A first non-overlapping subset may be selected. In one embodiment, one or more techniques may be applied when subdividing the set of tiles into subsets so that tiles that have a higher likelihood of producing good localized labeling are placed into the same subset, which may then be selected to be processed first. A localized graph cut may be performed for each tile in the first subset of non-overlapping tiles. Since the tiles in each individual subset do not intersect, the labeling algorithm may be executed in parallel for tiles in a subset. A localized graph cut may then be performed for each tile in a next subset of non-overlapping tiles. Results from tiles in subsets that have already been processed may be used as boundary conditions for the localized graph cut of the tiles. Using the solution for previously-processed tiles as boundary conditions for other tiles that overlap the tiles forces the graph cut to be continuous.

For multi-label problems, in one embodiment, graph cut labeling is performed on a low-resolution version of an image to find a low-resolution graph cut. A border traversal technique may be used to traverse the border. During the traversal, points that present only a bi-label problem and points that present a multi-label problem are determined and marked. A localized graph cut technique as described above for the bi-label case may be performed for the bi-label points. After the bi-label points are processed, a multi-label technique, e.g. an α-expansion or α-β swap algorithm, may be run for the multi-label points.

For the non-hierarchical case, a variation on the above technique is described that yields good results under the assumption that the user provides only the foreground or the background in the form of sufficiently large and continuous strokes. These assumptions are satisfied in various interactive selection tools. The approach taken is to divide the image (or the region of interest) into subregions and solve the energy minimization problem locally for each subregion. Embodiments then attempt to string together the local solutions to get a solution that is close to the global minimum, or at least a solution that is useful.

Figure 1A:
FIGS. 1A and 1B illustrate tiling, a user-selected foreground, and a foreground generated by a labeling algorithm, according to embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for localized labeling in digital images are described. Embodiments may be applied, for example, to generate graph cuts for image segmentation. Embodiments may provide a low memory, parallelizable implementation of graph cut-based image segmentation. In embodiments, the segmentation problem is solved using a technique of hierarchical graph cuts wherein the problem is first solved on a low-resolution version of the image, and then the low-resolution solution is upsampled to obtain a band of uncertainty in the high-resolution image within which the high-resolution graph cut would lie. The band of uncertainty is then subdivided into overlapping regions or tiles, and the graph cut segmentation problem is solved for each of the regions separately (referred to as a localized graph cut). The overlapping tiles may be used to provide boundary conditions that force the cut to be continuous. Advantages of the method over conventional techniques may include, but are not limited to, low memory usage, cache friendliness, and the potential for parallel execution. The solutions obtained from the method tend to be close to the global optimum.

Embodiments may be applied to either or both bi-label and multi-label graph cut labeling problems. While embodiments are generally described in respect to applications of graph cut labeling to generate graph cuts for image segmentation, embodiments may be applied in other applications for labeling in computer vision, computer graphics and computational photography.

Coherent Pixel Labeling

Many problems in computer vision can be expressed as a pixel labeling problem. A labeling function L assigns to each pixel p, a label $L(p) \in \{0, 1, \ldots, m-1\}$. For instance, a segmentation of an image I is equivalent to a labeling function L that assigns to each pixel p of an image I a label $L(p) \in \{0, 1\}$. To each such labeling, an energy E(L) is assigned, and the labeling that gives the lowest energy is chosen as the solution to the problem. The energy E(L) takes the form:

$$E(L) = E_d(L) + E_s(L) \qquad (1)$$

$$= \sum_{p \in I} d_p(L(p)) + \sum_{(p,q) \in N} V_{p,q}(L(p), L(q)) \qquad (2)$$

The first term:

$$E_d(L) = \Sigma_{p \in I} d_p(L(p)) \qquad (3)$$

is the data term that penalizes the assignment of label L(p) at pixel each p with a cost equal to $d_p(L(p))$. One can think of this term as penalizing deviations from observed data. The second term of energy:

$$E_s(L) = \sum_{(p,q) \in N} V_{pq}(L(p), L(q)) \qquad (4)$$

is the smoothness term that penalizes two neighboring pixels p and q labeled differently. The summation in the smoothness term runs over all pairs of neighboring pixels. Usually, a 4 or 8 neighborhood system is used to define neighboring pixels.

This term encourages coherent labeling. The commonly used function for the smoothness term is the Potts model energy term given by:

$$E_s(L) = \sum_{(p,q) \in N} J_{pq}(1 - \delta_{L(p),L(q)}) \qquad (5)$$

where $J_{p,q}$ is a coupling constant between pixels p and q and $\delta_{L(p),L(q)}$ is the Kronecker delta function.

The special case of two label problems that use the Potts model smoothness term can be solved for the global minimum in polynomial time by recasting this as a problem of finding the minimum cut of a specially designed graph. For the image segmentation problem, which falls under this special case, the frequently used coupling constant takes the form:

$$J_{pq} = \frac{1}{d(p, q)} e^{-\beta \|I(p) - I(q)\|}$$

where d(p, q) is the physical distance between positions of pixels p and q and $\|I(p)-I(q)\|$ is the euclidean color distance between them. The data term penalties are usually fixed via a user specified foreground and background regions (in case of interactive segmentation) or from some suitable prior.

For multi-label problems, the common methods used for minimizing the energy are the α-expansion or α-β swap methods. Both of these algorithms work by repeatedly computing the global minimum of a bi-label problem using graph cuts until convergence. The solution obtained is a strong local minimum. Some examples of multi-label problems are photomontage and panorama creation.

Embodiments of a hierarchical graph cut technique are described that may divide the problem into small manageable pieces, and solve the graph cut labeling for each piece independently. That is, the labeling of each pixel is determined using local information only. If the pieces are chosen well, putting together these localized solutions may yield a labeling that is very close to the global minimum. Since the problem is subdivided into several pieces, the number of vertices dealt with at a time (and hence the memory required) is greatly reduced, and a significant speedup may be realized due to cache friendliness. The approach is also amenable to parallelization. Thus, embodiments may exploit the trend in processor design towards multiple cores and software deployment on clusters.

Figure 1B:
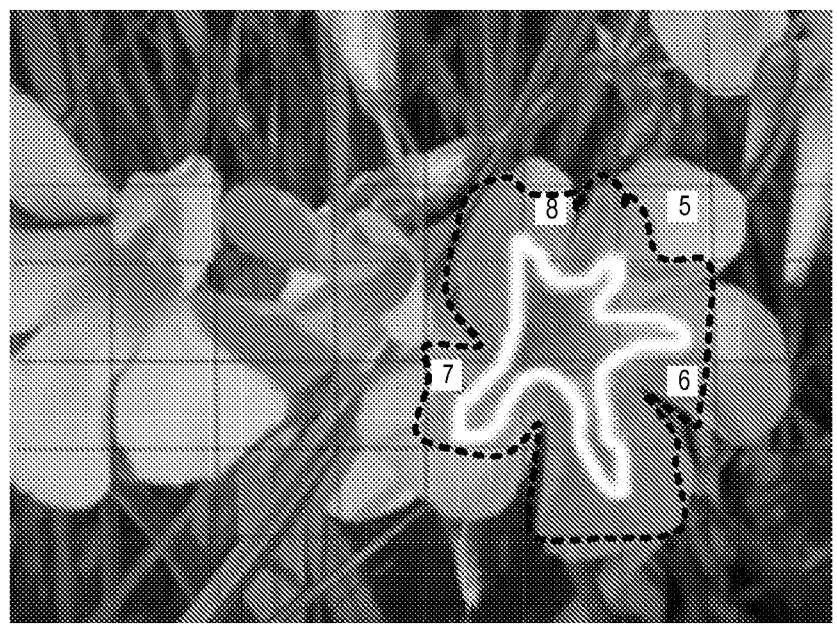

An approach to subdividing the graph cut problem could be to divide the image into non-overlapping rectangular tiles and running the graph cut algorithm tile by tile. This approach may not work well in practice. In several tiles, there may be no initial conditions (user marked foreground/background regions), or the proportions may greatly differ. Hence, such an approach may not get close to the global optimum by looking at local information only. Further, the labeling of adjacent tiles may not align and the resultant cut patched together from local solutions may not be smooth. FIGS. 1A and 1B illustrate this scenario. In FIGS. 1A and 1B, the user-selected foreground is shown as the white paint stroke. The tiling is shown superimposed on the images. In FIG. 1A, the tiles labeled 1 and 2 have no user defined foreground pixels, and the tile labeled 3 has a very small contribution from the foreground. In FIG. 1B, the darker-shaded pixels inside the dotted line are the ones labeled as foreground by the labeling algorithm according to embodiments, when applied independently to each tile. Note that there are discontinuities in the tiles marked 5, 6, 7 and 8 in FIG. 1B

In order to overcome limitations of the above approach, a form of flow recycling could be applied. For example, an image I may be cut into non-overlapping tiles $\{T_i\}_{i=1}^n$, and the graph cut may be performed locally on each tile $T_i$, while retaining the flow $f_i$ that was obtained. Once all the tiles have been done, a global corrective pass may be performed by connecting the neighboring tiles to each other and finding the max flow for I starting from the flow $\Sigma_{i=1}^n f_i$. While this technique may give the correct solution, it does not decrease memory usage and is unlikely to be much faster. The local max-flows may be significantly different from the global max-flow, and the running time and memory are likely to be dominated by the global corrective pass. Such a behavior would also reduce the potential of parallelization.

The main reason for the failure of simple tiling schemes is the lack of correct boundary conditions. When each tile or piece is solved independently, it is assumed that there is zero interaction with its neighboring tiles. However, if the correct boundary conditions are present, each piece may be solved independently, while still ending up with the correct global optimum. This technique, implemented in embodiments described herein, is made precise in the following proposition.

Let I be an image and let N be a neighborhood relation on the pixels on I. Let $I_1$ and $I_2$ be subsets of I such that $I=I_1 \cup I_2$, and if $(p, q) \in N$, then $p, q \in I_1$ or $p, q \in I_2$. Let $L_o$ be the optimal labeling of I under the energy as defined in equation 2.

Proposition 1: If the labeling $L_o$ on $I_1 \cap I_2$ is known, then, using it as the boundary condition, it is possible to independently solve for the optimal labeling on $I_1$ and $I_2$ and obtain the optimal labeling $L_o$ on every vertex of $I=I_1 \cup I_2$.
Proof of Proposition 1

Let I be a k-dimensional digital picture, and let N be a neighborhood relation on the pixels of I. Let $I_1$ and $I_2$ be subsets of I such that $I=I_1 \cup I_2$ and if $(p, q) \in N$, then $p, q \in I_1$ or $p, q \in I_2$. This condition on the subsets is to ensure that the intersection is thick enough that accurate labeling on $I_1 \cap I_2$ is sufficient to capture all of the interactions between $I_1$ and $I_2$. (See FIG. 2.) Let L be a labeling of I and let E(L) be its energy as defined in equation 1. Let $L_o$ be the labeling of I that has the least energy. The restriction of the labeling L and the neighborhood relation N on $U \subset I$ may be denoted by $L|_U$ and $N|_U$ respectively. The energy of the labeling restricted to U may also be considered. Note that in this case, since the neighborhood is also restricted to U, it is assumed that there is zero interaction of the subset U with the remaining pixels of I.

Proposition 2 (Inclusion-Exclusion principle). Let L be a labeling of $I=I_1 \cup I_2$. Then:

$$E(L|_{I_1})=E(L|_{I_1})+E(L|_{I_2})-E(L|_{I_1 \cap I_2})$$

Proof Since $E(L)=E_d(L)+E_s(L)$, it suffices to prove the proposition for the data term and the smoothness term separately. The proposition holds for the data term since:

$$E_d(L|_I) = \sum_{p \in I} d_p(L(p))$$

$$= \sum_{p \in I_1} d_p(L(p)) + \sum_{p \in I_2} d_p(L(p)) - \sum_{p \in I_1 \cap I_2} d_p(L(p))$$

$$= E_d(L|_{I_1}) + E_d(L|_{I_2}) - E_d(L|_{I_1 \cap I_2})$$

For the smoothness term, consider the expression:

$$S(L) = E_s(L|_{I_1}) + E_s(L|_{I_2})$$

$$= \sum_{(p,q) \in N|I_1} V_{pq}(L(p), L(q)) + \sum_{(p,q) \in N|I_2} V_{pq}(L(p), L(q))$$

By the thickness condition on $I_1 \cap I_2$, $(p, q) \in N \Rightarrow (p, q) \in N|I_1$ or $(p, q) \in N|I_2$. Hence S(L) overestimates $E_s(L)$ by precisely the smoothness term restricted to $I_1 \cap I_2$.

$$S(L) = E_s(L) + \sum_{(p,q) \in N|I_1 \cap I_2} V_{pq}(L(p), L(q))$$

Rearranging and re-writing the terms gives:

$$E_s(L)=E_s(L|_{I_1})+E_s(L|_{I_2})-E_s(L|_{I_1 \cap I_2})$$

Proposition 3 (Localized labeling). If the optimal labeling $L_o$ restricted to h $I_1 \cap I_2$ were known, then, using it as the boundary condition, it is possible to independently solve for the optimal labeling on $I_1$ and $I_2$ and obtain the optimal labeling $L_o$ on every vertex of $I=I_1 \cup I_2$.

Proof Since there is a labeling $(L_o|I_1 \cap I_2)$ on $I_1 \cap I_2$, it may be to obtain labelings on $L_1$ on $I_1$ and $L_2$ on $I_2$. Since $L_1$ and $L2$ agree on $I_1 \cap I_2$, the independent labelings can be extended to the whole image I. The extended labeling may be called L. To prove that L is optimal on I, note that since $L_o$ is the optimal labeling on I, $E(L_o) \leq E(L)$. On the other hand:

$$E(L_o)=E(L_o|_{I_1})+E(L_o|_{I_2})-E(L_o|_{I_1 \cap I_2}) \quad \text{(proposition 2)}$$

But it is also known that $L_1$ and $L_2$ are optimal in $I_1$ and $I_2$. Hence, $$E(L_o) \geq E(L_o|_{I_1})+E(L_o|_{I_2})-E(L_o|_{I_1 \cap I_2})$$

$$\geq E(L|_{I_1})+E(L|_{I_2})-E(L|_{I_1 \cap I_2}) \; (L_o=L \text{ on } I_1 \cap I_2)$$

$$\geq E(L) \quad \text{(proposition 2)}$$

Therefore, it may be concluded that $E(L)=E(L_o)$, which proves Proposition 1.

Figure 2:
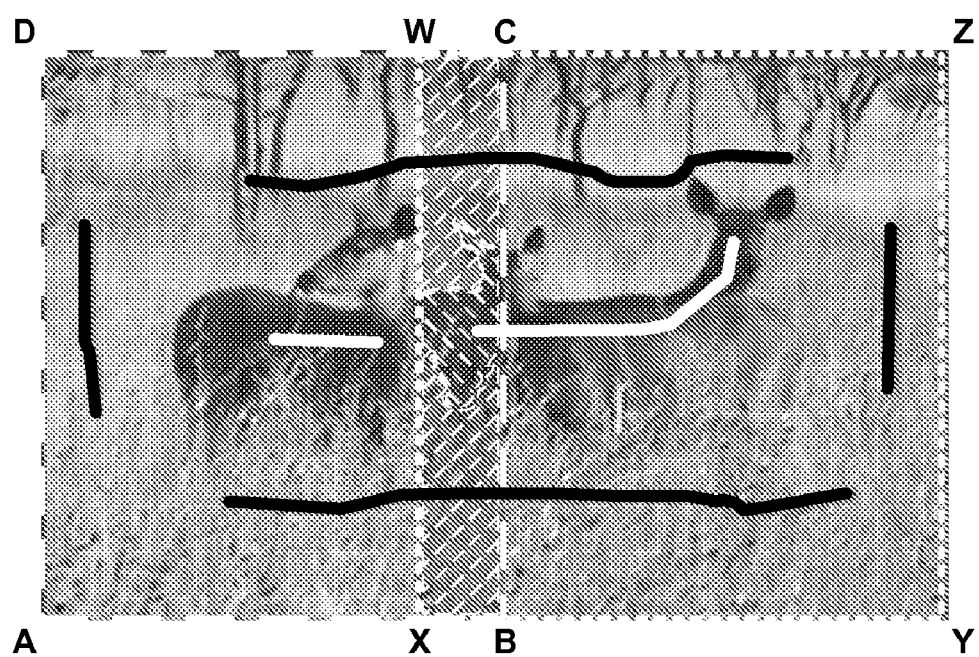
FIG. 2 illustrates two overlapping rectangles tiles and an intersecting region thereof, with foreground and background pixels, according to one embodiment.

The above proves Proposition 1. In addition, FIG. 2 may be used to illustrate an informal demonstration. In FIG. 2, the foreground pixels are marked by the white line or stroke and the background pixels are marked by the black strokes. If the exact labeling is available in the intersection of rectangles ABCD and XYZW, this can be used it to find the optimal labeling in the rectangles. This is possible because once the labels in the common area (the rectangle defined by points XBCW) are fixed, the two rectangles can be treated as if they no longer interact with each other.

Embodiments may exploit the above Proposition 1 by finding the optimal labeling for some pieces of the image in a localized manner and using those as the boundary conditions to find the labels of more pieces (again in a localized manner), and so on, until the labeling of the whole graph is obtained.
Localized Hierarchical Graph Cuts: Bi-Label Case In the banded/hierarchical graph cut technique, a band of uncertainty in the high-resolution image is obtained for which the optimal labeling is to be found. This case lends itself nicely to the method of localized graph cuts described herein. Within a well chosen region or tile of the band of uncertainty (for example, tile 210A in FIG. 3B), a localized graph cut on this tile will yield the correct labeling for a majority of the vertices in the tile.

Figure 3A:
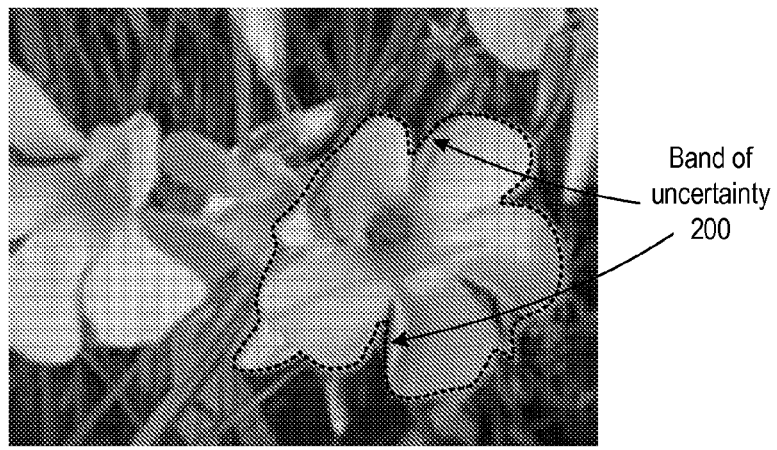
FIG. 3A shows a band of uncertainty according to one embodiment.
Figure 3B:
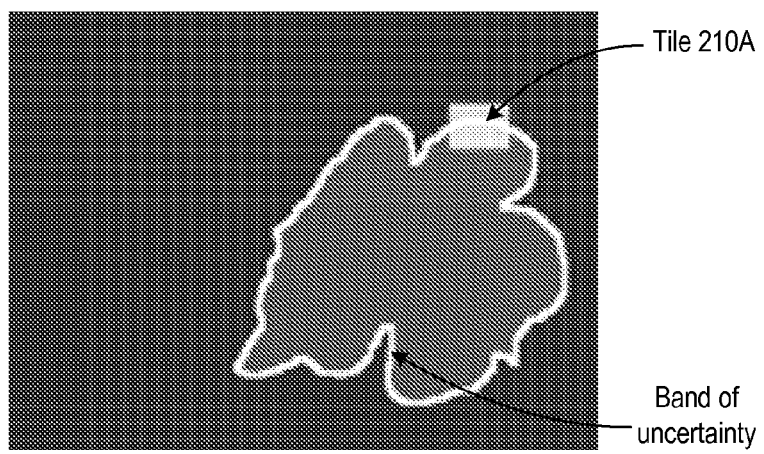
FIG. 3B shows an example of a proper tile according to one embodiment.

If the localized labeling is to be close to the global labeling, the tiles need to be well chosen, such as tile 210A in FIG. 3B. The notion of a well chosen tile may be made precise by the following definitions.

Let I be an image. It is assumed that the image is padded by one pixel on all sides. Let P denote the set of padding pixels, each of which is labeled pd. Let N be the set of points of the band for which the labeling is to be determined. In case of hierarchical segmentation, this band N is determined from a lower resolution solution. It is usually taken as a tube of radius d (which is small compared to the image dimensions) around the boundary of an approximate labeling obtained by upsampling the low resolution solution. N may be referred to as the region of uncertainty. Let F and G be the pixels labeled as foreground and background.

Figure 4:
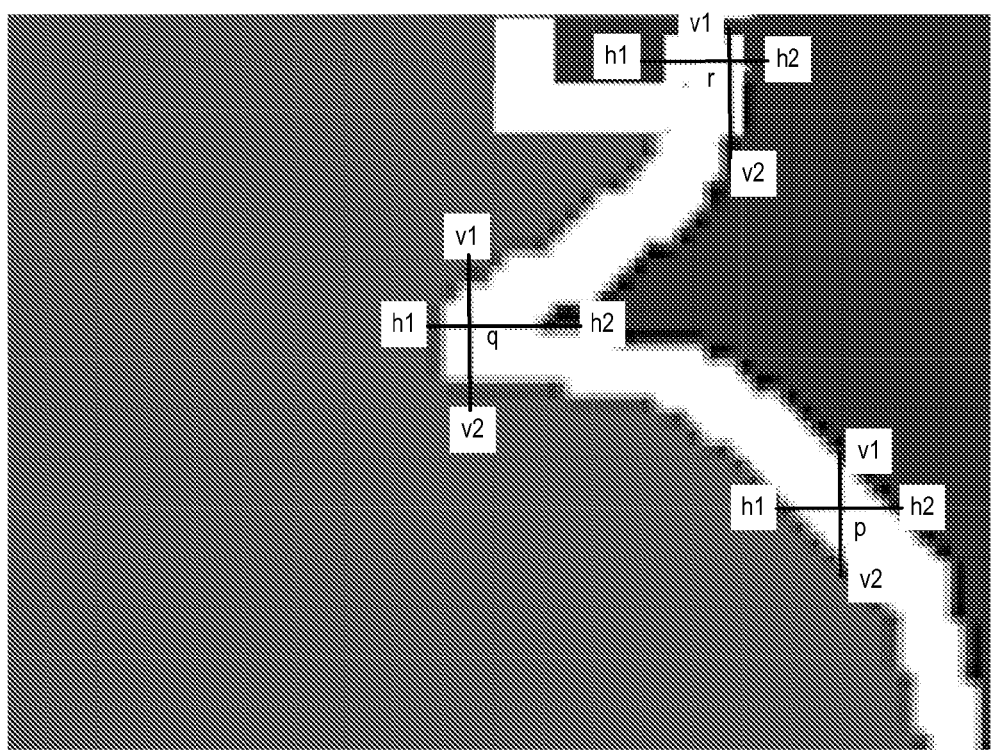
FIG. 4 illustrates orthogonal slices according to one embodiment.

Definition 1 (Orthogonal Slicing). With reference to FIG. 4, for every point p∈N, two axis parallel lines may be drawn. These lines will meet at least two labeled points. Let h1, h2 and v1, v2 be the labeled points that are closest to p on the horizontal line and vertical line respectively. These lines (one joining h1, p and h2 and the other joining v1, p and v2) are the two orthogonal slicings of N at p.

Definition 2 (Proper Orthogonal Slice). Let the points p1, p and p2 define an orthogonal slice of N at p. This slice is called proper if p1 and p2 have different labels.

Note that p1 or p2 may be a padding point lying outside the image. As long as the labels of p1 and p2 differ, the slice is still considered proper. It is possible that for some points, both the orthogonal slices are not proper. However, a majority of points in N will have at least one proper orthogonal slicing.

FIG. 4 illustrates orthogonal slices. At p both the slices are proper. At q the vertical slice is improper. The point r is pathological since both the slices are not proper.

Definition 3 (Proper Tile). A tile is proper if and only if for any unlabeled point p that lies on an edge e of the tile, e contains a proper orthogonal slice of N at p.

Figure 3C:
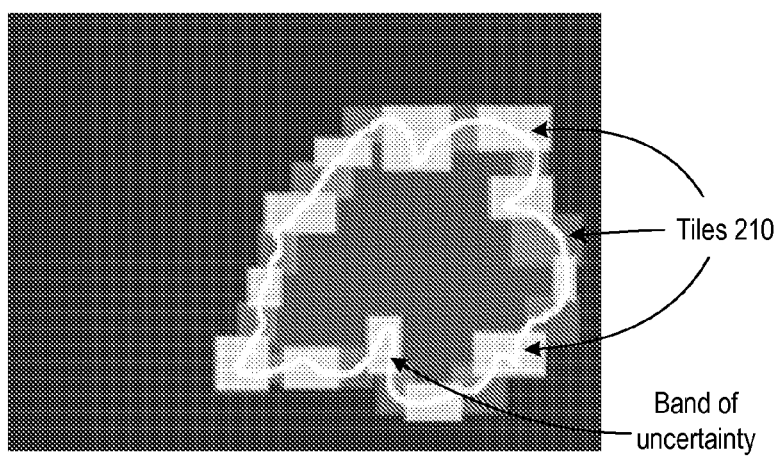
FIG. 3C shows a covering of the band of uncertainty by overlapping tiles according to one embodiment.

In one embodiment, the band is first covered with such overlapping tiles. The tiles are divided into several non-overlapping sets, and localized labeling is performed one set at a time. Since the tiles in each individual set do not intersect, the labeling algorithm may be executed in parallel. After each set is done, the labels are frozen on vertices for which there is a high degree of confidence. These labels then serve as boundary conditions for the subsequent sets. When all the sets are done, the result is a labeling that is very close to the global optimum. FIGS. 3A through 3C illustrate this technique.

FIG. 3A shows the band of uncertainty 200 as the band around the dotted line. FIG. 3B shows an example of a proper tile 210A. Note that the tile 210A has a balanced amount of foreground and background. Localized labeling is likely to give the correct solution in most of the areas, excluding the pixels close to the vertical tile edges. FIG. 3C shows a covering of the band 200 by overlapping tiles 210. The tiles may be split into multiple, for example two, non-overlapping subsets (the non-overlapping subsets shown in FIG. 3C as tiles in different shades). Tiles in one subset are processed first, before any of the tiles in the other subset(s). Due to the overlaps, the first subset of tiles, once processed, may be used to provide boundary conditions to guide the processing of the tiles in the second subset. If there are more than two subsets, the previously processed subsets may be used to provide boundary conditions to guide the processing of the tiles in subsequent subsets.

Choosing the Overlapping Tiles

In one embodiment, to cover a band N with overlapping proper tiles efficiently, $N_1$, a down-sampled version of N, may be covered with overlapping proper tiles, and the geometry of the covering may be upsampled to the full resolution.

Figure 5:
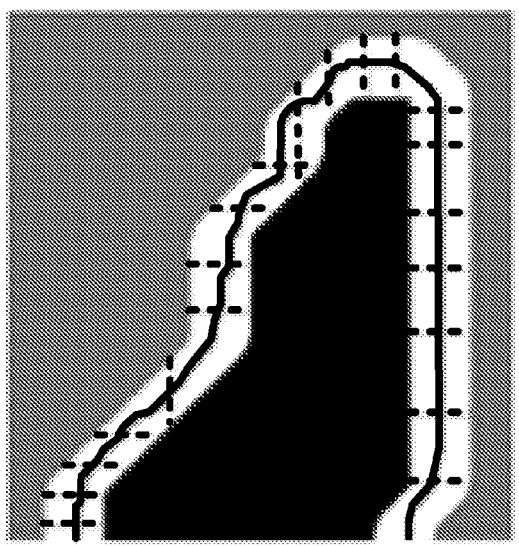
FIG. 5 illustrates a sweeping procedure according to one embodiment.

For every connected component C of the band $N_1$, let $F_a$ be the approximation of the foreground, obtained by upsampling the low resolution graph cut solution. Let $\partial F_a$ be its boundary. A border tracing algorithm may be used to travel along the boundary $\partial F_a$, and sweep points of C that surround the traversed part of the border. For each point p that is obtained from the tracer, the point p and the end points of the smallest proper orthogonal slice at p are accumulated. If both the orthogonal slices at a point $p_i$ are not proper, no end points are chosen for that point. FIG. 5 illustrates a sweeping procedure according to one embodiment. The black line in the middle of the white band is the boundary of the foreground. The dashed black lines are the chosen orthogonal slices.

Figure 6:
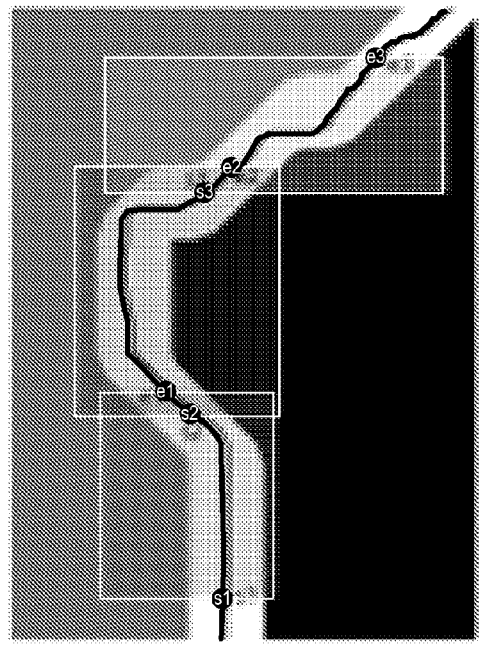
FIG. 6 illustrates proper tiles produced by the sweeping procedure according to one embodiment.

When enough points are accumulated, the process is stopped and the bounding box of all the accumulated points is taken as the desired tile covering the part of band that has been traversed. Since the tiles need to overlap, the process backtracks a specified distance along the boundary before restarting the tracing. The distance may be specified in any of various metrics, e.g. a number of pixels, a Euclidian distance, and so on. To ensure that the tile is proper, the tile may be expanded a bit if necessary. The expansion may be done either by sweeping a few more points or simply increasing the tile dimensions until the tile becomes proper. FIG. 6 illustrates the proper tiles produced by the sweeping procedure, according to one embodiment. The points s1, s2, s3 are the starting points and e1, e2, e3 are the end points. The overlaps are produced because the starting points of one tile lie within the previous tile.

Choosing the Non-Overlapping Sets

Once the band is covered in the high resolution with overlapping tiles $\{T_i\}_{i=1}^n$, the set of tiles need to be separated into two or more non-overlapping subsets. A non-overlapping subset is a subset of tiles in which no two tiles in the subset overlap. Note, however, that the tiles will overlap tiles in other subset(s). One embodiment may treat this as a graph coloring problem on an undirected graph whose vertices are the tiles, with $T_i$ and $T_j$ connected by an edge if and only if $T_i \cap T_j = \emptyset$. While any suitable graph coloring algorithm may be used in various embodiments, one embodiment may use a modified version of the Welsh-Powell algorithm [Welsh, Powell: An upper bound for the chromatic number of a graph and its application to timetabling problems. *The Computer Journal* 10 (1967), 85-86]. The set of tiles is partitioned based on color. By definition, two tiles having the same color will not overlap.

Apart from absence of overlaps, the coloring may be made in such a way that, as much as possible, tiles that have a higher likelihood of producing good localized labeling are processed earlier. To encourage such a coloring, the list of vertices corresponding to the tiles may be sorted in a decreasing order of likelihood of getting a good labeling. The sorted list of vertices is provided as the input to the graph coloring algorithm, e.g. the Welsh-Powell algorithm. Tiles below a certain likelihood threshold are not allowed to be a part of the first set of tiles.

Let T be a tile and let $T_l$ be its downsampled version in the resolution at which the labeling problem was solved. Let E be the energy of the cut in the tile $T_l$ and let k be the length of the cut. In one embodiment, the quantity $$\frac{k}{E}$$

may be used to measure the likelihood of a good labeling. This measure is motivated from an observation that tiles with a smaller cut energy (sharper edge) or longer cut length are more likely to yield good localized labels. Alternatively, the cut length may be used by itself.

In one embodiment, a pruning pass may be run to reduce the number of tiles. If the resolution level at which the tile covering is done is much larger than the base level, the tiles tend to have a high degree of overlap. In the pruning pass, tiles that have a large amount of overlap (an amount of overlap over a specified threshold) are merged. In addition, tiles that are completely contained in other tiles are removed. If the boundary is smooth and the traversal is good, each tile intersects exactly two others and all the tiles may be processed in two or three passes.

Confidence of Localized Labeling

When the labeling problem is solved in a localized way, the labels that are close to the center of the tile are likely to be correct. The labels close to the tile edges without any boundary conditions to support them may not be correct. In one embodiment a distance threshold from the edge may be specified and used to exclude labels within that distance threshold from the edge from being used as boundary condition labels for other tiles. Therefore, in one embodiment, after each set of tiles is processed, a smaller rectangle or region may be determined within each of the tiles within which the labels are deemed to be correct. These labels are frozen, and they form the boundary conditions for the subsequent sets of tiles. The other labels that are within the distance threshold from the edge are set to special labels that indicate that the labels are uncertain. The labels of pixels that are frozen are not touched.

Figure 7:
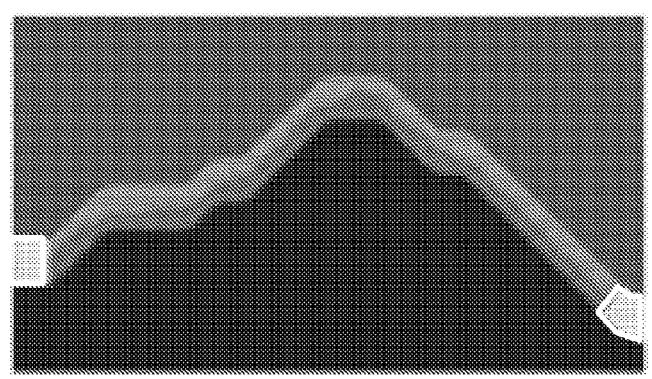
FIG. 7 illustrates regions of uncertainty, according to one embodiment.

FIG. 7 illustrates regions of uncertainty. The white bounded areas on the left and right edges of the band are regions of low confidence in the localized labeling.

Figure 8:
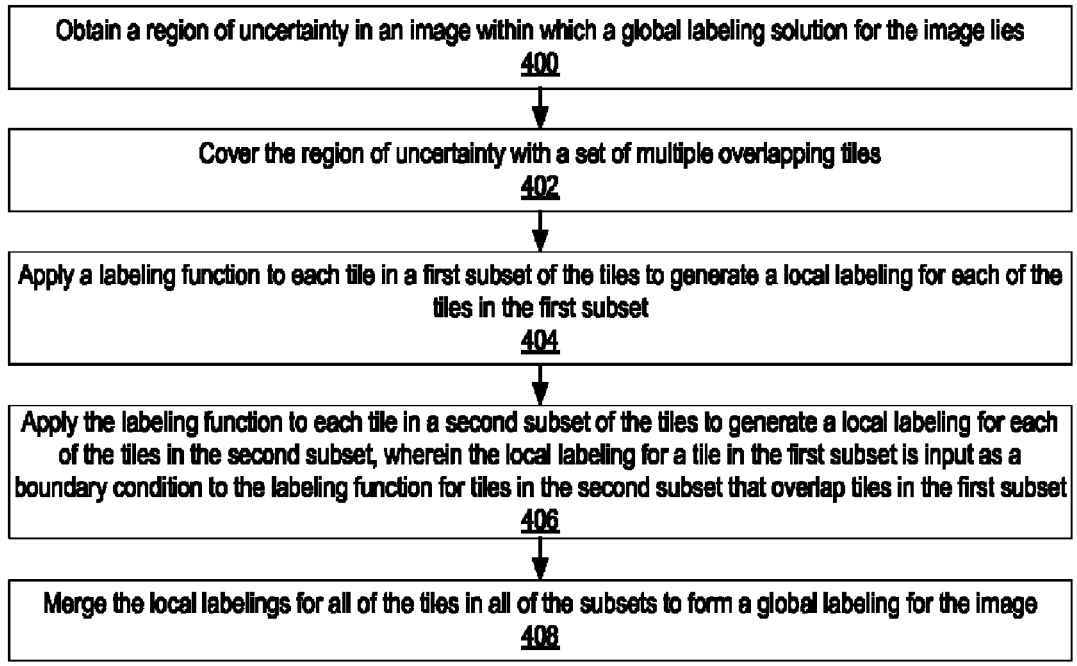
FIG. 8 is a flowchart of a method for localized labeling according to one embodiment.

FIG. 8 is a flowchart of a method for localized labeling according to one embodiment. As indicated at 400, a region of uncertainty in an image may be obtained within which a global labeling solution for the image lies. In one embodiment, the region of uncertainty may be obtained by performing a labeling function on a lower-resolution version of the image to generate a low-resolution labeling, and upsampling the low-resolution labeling to the image to generate the region of uncertainty.

As indicated at 402, the region of uncertainty may be covered with a set of multiple overlapping tiles. In one embodiment, the region of uncertainty may be covered with multiple overlapping tiles by performing a labeling function on a lower-resolution version of the image to generate a low-resolution labeling, covering a low-resolution region defined by the low-resolution labeling with a set of multiple overlapping low-resolution tiles, and upsampling the set of multiple overlapping low-resolution tiles to the image to generate the set of multiple overlapping tiles that cover the region of uncertainty in the image.

As indicated at 404, a labeling function may be applied to each tile in a first subset of the tiles to generate a local labeling for each of the tiles in the first subset. Examples of labeling functions that may be applied may include, but are not limited to, graph cut labeling functions and Markov random field (MRF) labeling functions. In one embodiment, the set of multiple overlapping tiles may be separated into subsets including the first subset and the second subset by applying a graph coloring algorithm to the set of multiple overlapping tiles.

As indicated at 406, the labeling function may then be applied to each tile in a second subset of the tiles to generate a local labeling for each of the tiles in the second subset. The local labeling for tiles in the first subset are input as a boundary condition to the labeling function when applied to overlapping tiles in the second subset. As indicated at 408, the local labelings for all of the tiles in all of the subsets may be merged to form a global labeling for the image.

In one embodiment, the labeling function may be applied to at least two of the tiles in parallel.

Figure 9:
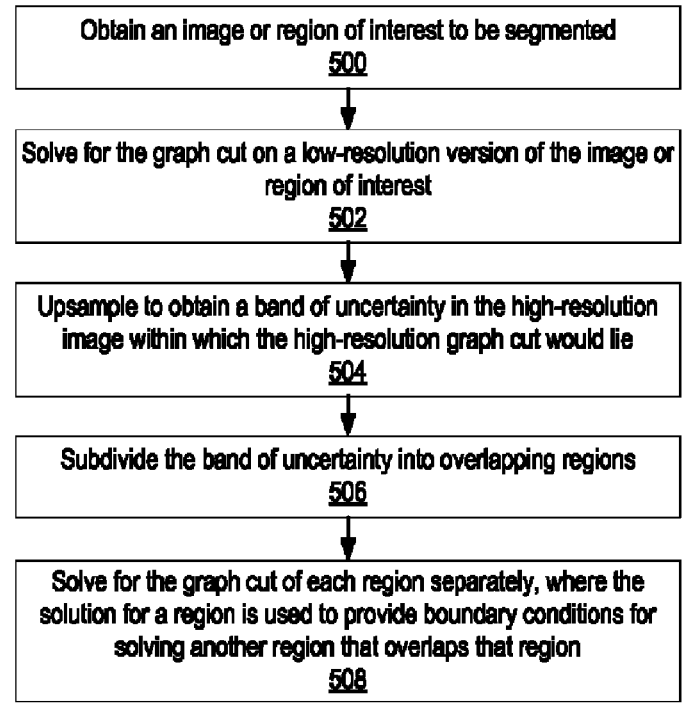
FIG. 9 is a high-level flowchart of an image segmentation method according to one embodiment.

FIG. 9 is a high-level flowchart of an image segmentation method as described above according to one embodiment. As indicated at 500, an image or region of interest to be segmented is obtained. User input directing a desired image segmentation may also be obtained, e.g. strokes that define exemplary foreground and background regions. As indicated at 502, the segmentation problem is first solved on a low-resolution version of the image, for example using a graph cut labeling technique, and then upsampling is performed to obtain a region of uncertainty, which in an image segmentation problem may be referred to as a band of uncertainty in the high-resolution image within which the high-resolution graph cut would lie, as indicated at 504. The band is then subdivided into overlapping tiles as indicated at 506, and the graph cut segmentation problem is solved for each of the tiles separately (the "localized" graph cut), as indicated at 508. The solution for a tile may be used to provide boundary conditions for solving another tile that overlaps that tile. Using the solution for already-processed tiles as boundary conditions for other tiles that overlap the tiles forces the cut to be continuous. Note that, while the graph cut segmentation problem is solved for each of the tiles separately, because of the subdividing of the graph cut problem into tiles, two or more non-overlapping tiles may be processed in parallel, for example using multithreading and/or a mutlicore or multiprocessor system.

Figure 10:
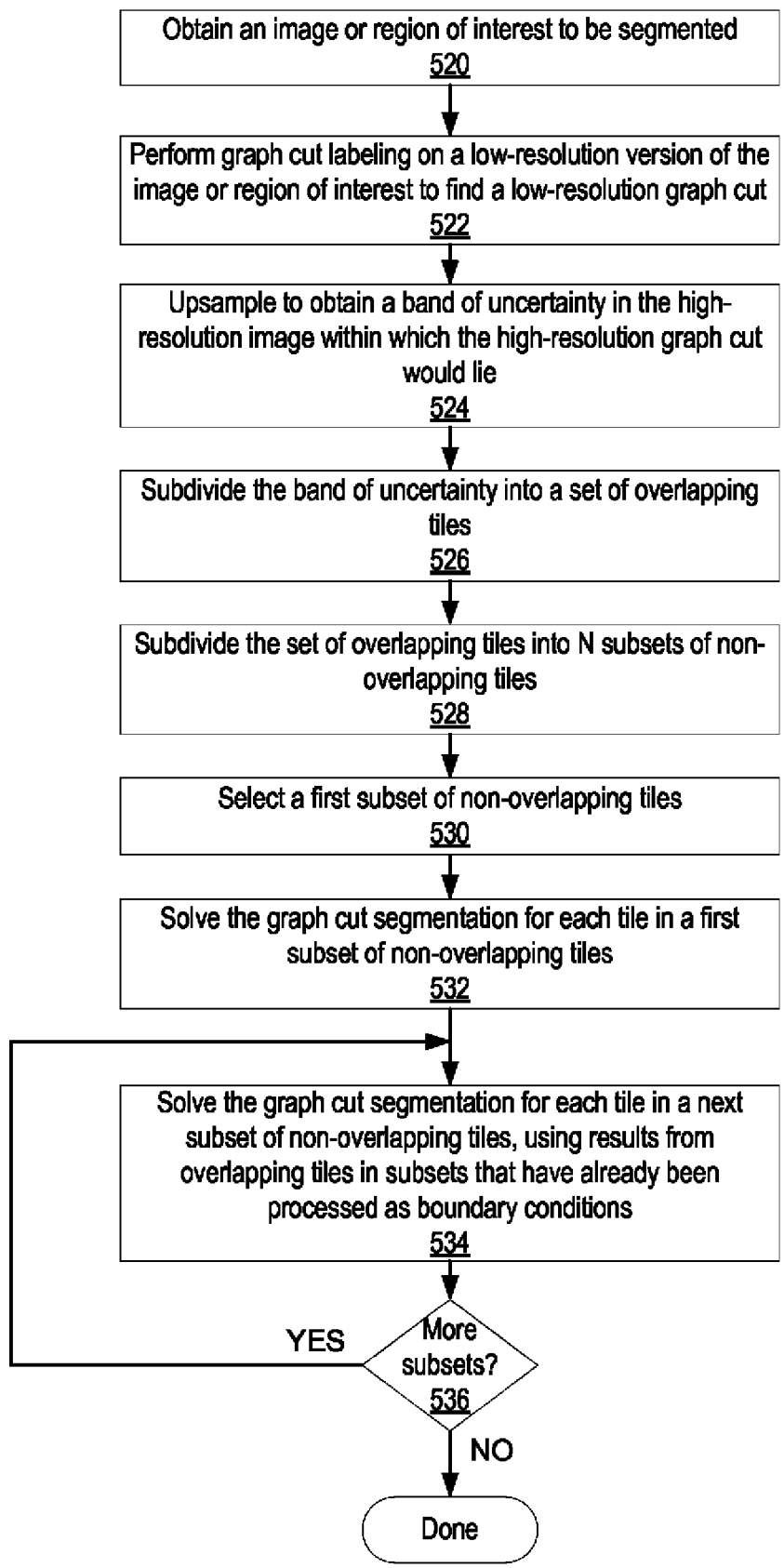
FIG. 10 is a more detailed flowchart of an image segmentation method according to one embodiment.

FIG. 10 is a more detailed flowchart of an image segmentation method according to one embodiment. As indicated at 520, an image or region of interest to be segmented is obtained. User input directing a desired image segmentation may also be obtained, e.g. strokes that define exemplary foreground and/or background regions. As indicated at 522, graph cut labeling is performed on a low-resolution version of the image to find a low-resolution graph cut. As indicated at 524, upsampling from the low-resolution graph cut to the high-resolution image may be performed to obtain a "fuzzy" region or band of uncertainty within which the high-resolution graph cut would lie. As indicated at 526, the band of uncertainty may be subdivided into a set of overlapping tiles.

In one embodiment, to subdivide the band of uncertainty into a set of overlapping tiles, the low-resolution graph cut may be overlaid with a set of overlapping tiles. The low-resolution tiles may then be upsampled from the high-resolution image to form the set of overlapping tiles on the high-resolution image within which the high-resolution graph cut would lie. In other embodiments, other methods may be used to generate the set of overlapping tiles. See the sections titled Localized Hierarchical Graph Cuts: Bi-Label Case and Choosing the Overlapping Tiles for more details on an exemplary method or methods that may be used to cover the band of uncertainty in the high-resolution image with a set of overlapping tiles.

In one embodiment, an intermediate image, i.e. an image that is intermediate in size between the low-resolution image on which the graph cut labeling is performed to generate the low-resolution graph cut, may be used to subdivide the band of uncertainty into a set of overlapping tiles. For example, the high-resolution image may be a 10 k×10 k pixel image. The lower resolution image may be, e.g., 640×480 pixels. With such an extreme difference in size, each pixel in the lower resolution image corresponds to a large area in the high-resolution image. When traversing such a small border with a border tracing algorithm, the traversal becomes difficult to control. Good overlaps are needed, but not too many overlaps. Thus, in one embodiment, at least in such cases where the low- and high-resolution images are significantly different in size, the lower resolution image may be upsampled to an intermediate resolution large enough to provide sufficient control of the border traversal algorithm. The intermediate resolution image may then be used to subdivide the band of uncertainty into a set of overlapping tiles.

As indicated at 528, the set of overlapping tiles may then be subdivided into N non-overlapping subsets, where N is an integer greater than or equal to 2. A non-overlapping subset is a subset of tiles in which no two tiles in the subset overlap. Note, however, that the tiles will overlap tiles in other subset(s). See, for example, the section titled Choosing the non-overlapping sets for an exemplary method or methods that may be used to subdivide the set of overlapping tiles into N non-overlapping subsets. In one embodiment, one or more techniques may be applied so that, as the tiles are sorted into the subsets, tiles that have a higher likelihood of producing good localized labeling are placed into the same subset, which will then be processed first.

As indicated at 530, a first non-overlapping subset (each subset containing non-overlapping tiles) may be selected. As noted above, in one embodiment, one or more techniques may be applied when subdividing the set of tiles into subsets so that tiles that have a higher likelihood of producing good localized labeling are placed into the same subset, which may then be selected to be processed first. In other embodiments, an analysis of the non-overlapping subsets may be performed to determine a subset that has a higher likelihood of producing good localized labeling across the tiles in the subset.

As indicated at 532, a localized graph cut may be performed for each tile in the first subset of non-overlapping tiles. Since the tiles in each individual subset do not intersect, the labeling algorithm may be executed in parallel for tiles in a subset.

As indicated at 534, a localized graph cut may be performed for each tile in a next subset of non-overlapping tiles. Results from tiles in subsets that have already been processed may be used as boundary conditions for the localized graph cut of the tiles. At 536, if there are more subsets to be processed, the method returns to 534 to process the next subset, using results from the previously processed subset(s) as boundary conditions. Using the solution for previously-processed tiles as boundary conditions for other tiles that overlap the tiles forces the graph cut to be continuous.

In one embodiment, after each subset is done, the labels are frozen on vertices for which there is a high degree of confidence. When the labeling problem is solved in a localized way, the labels that are close to the center of the tile are likely to be correct. The labels close to the tile edges without any boundary conditions to support them may not be correct. Therefore, in one embodiment, after each set of tiles is processed, a smaller rectangle or region may be carved within each of the tiles within which the labels are deemed to be correct. These labels are frozen, and they form the boundary conditions for the subsequent sets of tiles. The other vertices are set to special labels that indicate that the label is uncertain.

Multi-Label Problems

Figure 11:
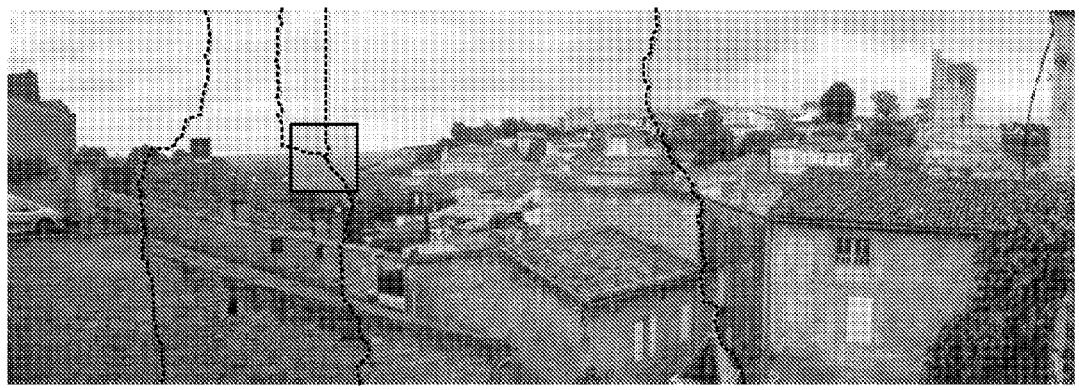
FIG. 11 shows the seams created in a typical panorama creation application.

The method outlined above can be applied to multi-label problems as well as to bi-label problems. A bi-label problem is a problem in which there are two and only two labels for pixels, e.g. foreground and background. A multi-label problem is one in which there are more than two labels for pixels. Since the inner loop of the $\alpha$-expansion or $\alpha$-$\beta$ swap method is a binary graph cut, the above method may be used to reduce the time taken in the inner loop. While this would speed up the process, further optimization may be realized by exploiting the structure of the problems. Note that in case of image stitching applications such as panorama creation or photomontage, most of the seams will lie on a boundary between two labels. FIG. 11 shows the seams created in a typical panorama creation application. The seams are shown as dotted lines, and potential multi-label points are shown highlighted.

Figure 12A:
FIG. 12A illustrates an input to the multi-label problem of panorama creation.
Figure 12B:
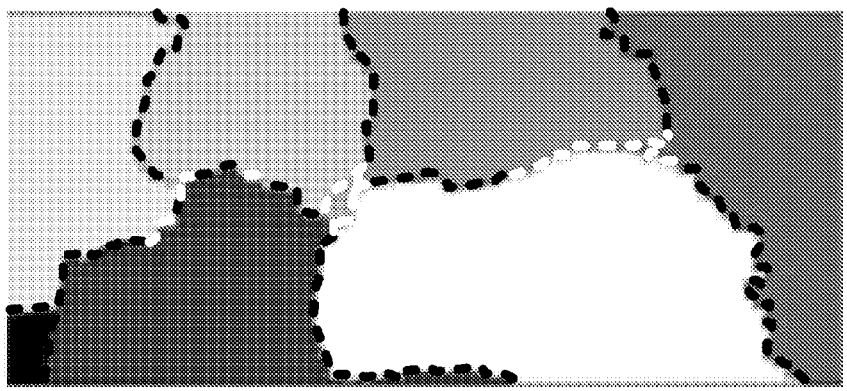
FIG. 12B shows the labeled regions obtained from the low resolution and the band of uncertainty for a multi-label problem, according to one embodiment.

In one embodiment, the set of points in the area of uncertainty may be separated into multi-label points (points that lie on a boundary of more than two labels) and bi-label points. FIG. 12A illustrates an input to the multi-label problem of panorama creation. The alignment of the individual frames are shown marked in black dashed lines. In FIG. 12B, the labeled regions obtained from the low resolution and the band of uncertainty are shown. The multi-label points are marked by the white dashed lines and the bi-label points are marked by the black dashed lines.

In one embodiment, this may be done by searching labels in a rectangular or square window around each seam point in the low resolution solution and checking if there are more than two labels in the window. The band of bi-label points may then be covered with overlapping proper tiles. On most such proper tiles, only a binary labeling problem needs to be solved, even though the choice of labels may be different for different tiles. The localized labeling is thus obtained for most of the bi-label points. For the remaining points (multi-label points as well as the bi-label points with uncertain labels) the global $\alpha$-expansion or $\alpha$-$\beta$ swap algorithms may be run. In typical applications, the number of multi-label points is likely to be very small. Hence a significant speed up may be obtained. In terms of complexity, if there are l labels and v vertices in the band, the global $\alpha$-expansion will take $O(lv^3)$ time, whereas the localized implementation will take $O(v^3)$ time.

Figure 13:
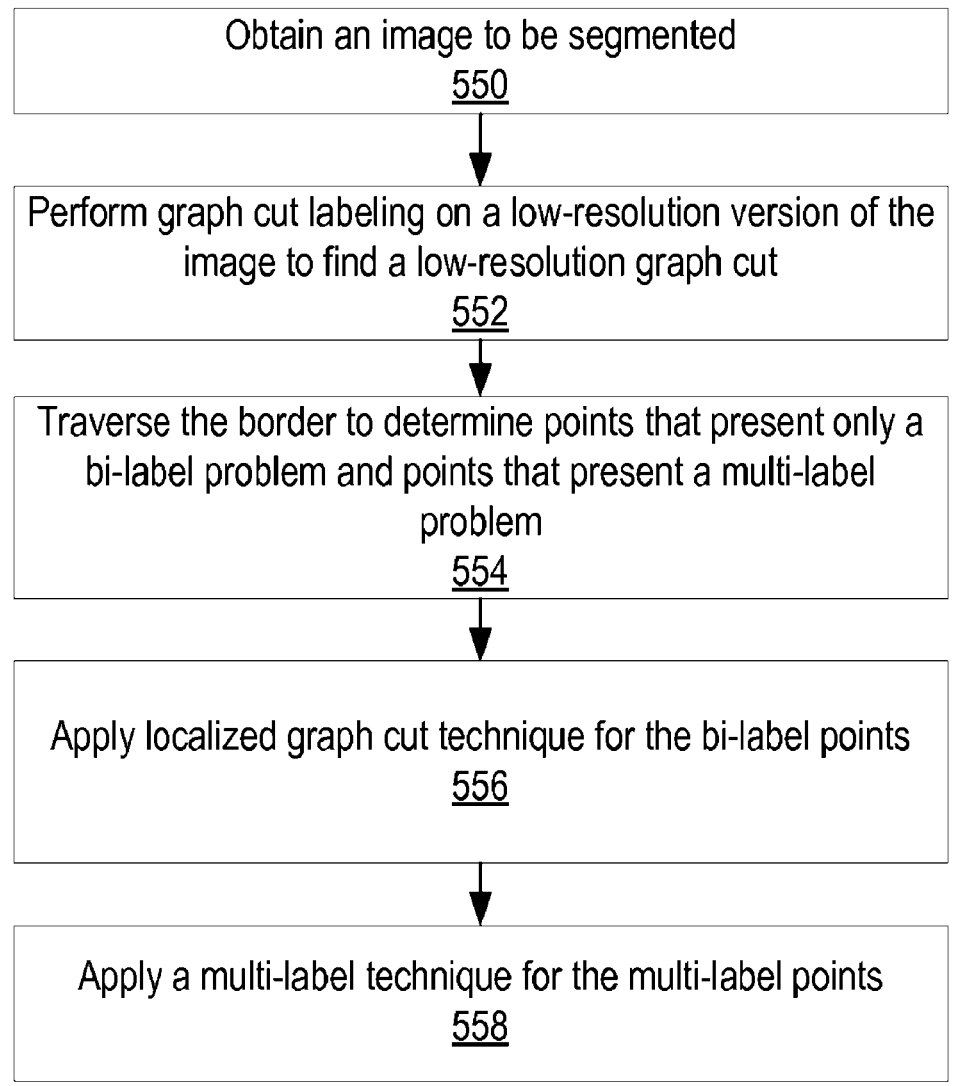
FIG. 13 is a flowchart of an image segmentation method for multi-label problems according to one embodiment.

FIG. 13 is a flowchart of an image segmentation method for multi-label problems according to one embodiment. As indicated at 550, an image to be segmented is obtained. User input directing a desired image segmentation may also be obtained, e.g. strokes that define exemplary multi-label regions. As indicated at 552, graph cut labeling is performed on a low-resolution version of the image to find a low-resolution graph cut. As indicated at 554, a border traversal technique may be used to traverse the border. During the traversal, points that present only a bi-label problem and points that present a multi-label problem are determined and marked. As indicated at 556, a localized graph cut technique as described above for the bi-label case may be performed for the bi-label points to generate localized graph cuts in regions around the bi-label points. As indicated at 558, in one embodiment after the bi-label points are processed, a multi-label technique, e.g. an $\alpha$-expansion or $\alpha$-$\beta$ swap algorithm, may be run for the multi-label points to generate portions of the graph cut around the multi-label points. The portions of the graph cut produced for the bi-label points and the multi-label points may then be merged to form a global graph cut for the image.

While FIG. 13 shows the processing of the bi-label points prior to the processing of the multi-label points, in one embodiment, the order of processing may be reversed. In other words, a multi-label technique, e.g. an α-expansion or α-β swap algorithm, may be run for the multi-label points to generate portions of the graph cut around the multi-label points, and then a localized graph cut technique as described above for the bi-label case may be performed for the bi-label points to generate localized graph cuts in regions around the bi-label points.

Results

The labeling obtained by the localized graph cut technique described above may be close to the global minimum, and in many cases may converge to the minimum. The places where the localized result diverges from the global are typically areas with very small gradients. If a reasonably strong edge is present, the localized solution may rarely give a wrong labeling. Even in the case of low gradient areas, increasing the extent of overlaps between the tiles may minimize the departures from the global minimum considerably.

Figure 14A:
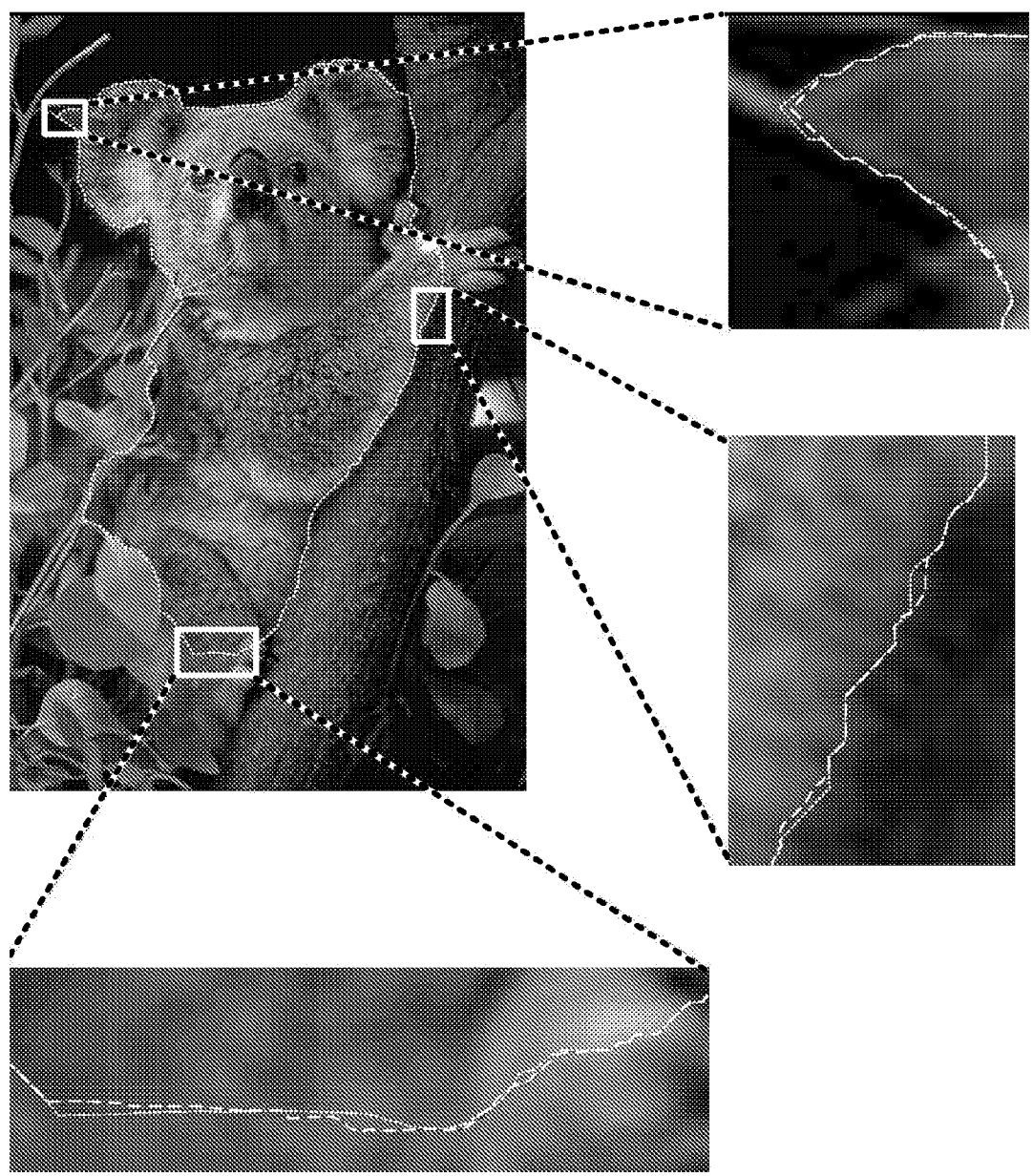
FIGS. 14A and 14B illustrate exemplary results of an embodiment of the hierarchical graph cut algorithm in the bi-label case.
Figure 14B:
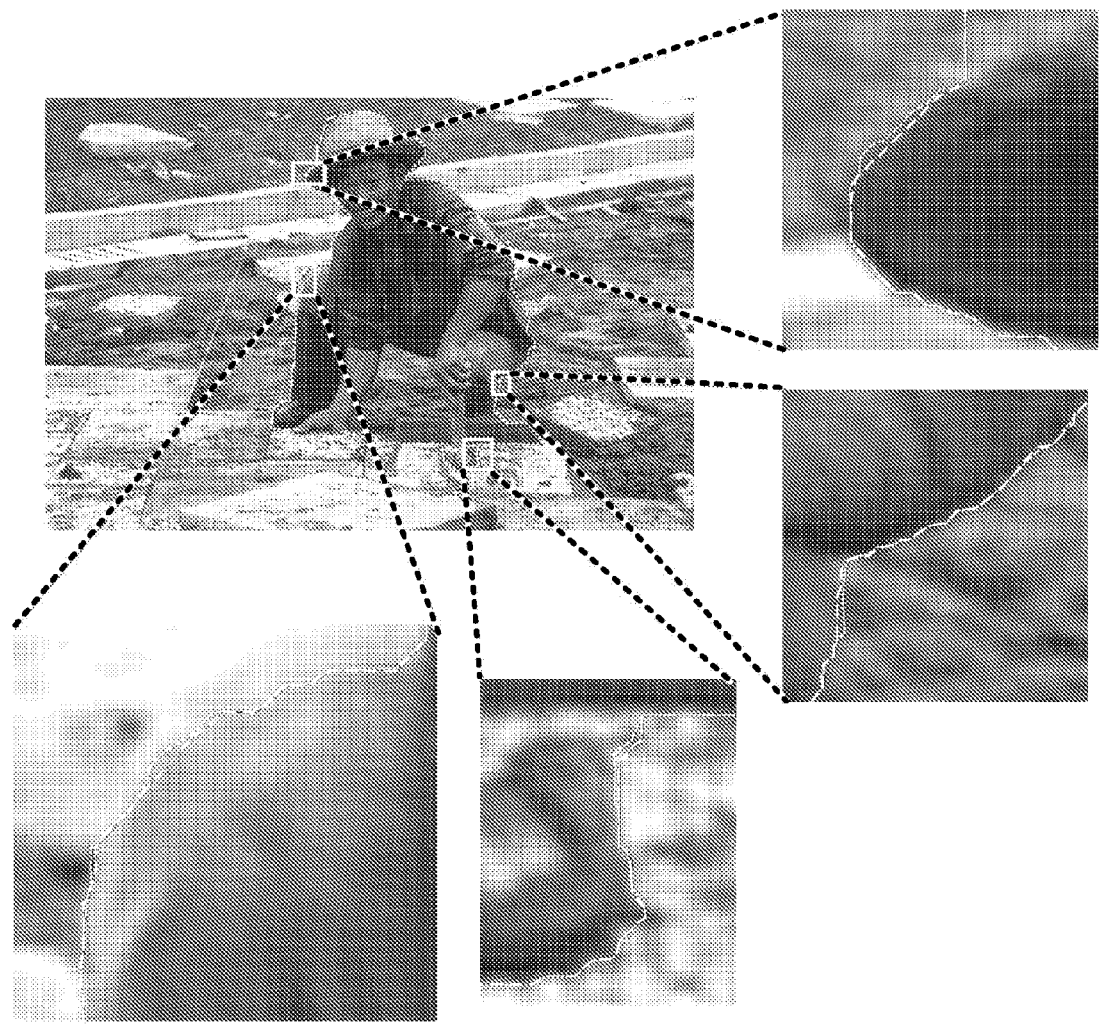

FIGS. 14A and 14B illustrate exemplary results of an embodiment of the hierarchical graph cut algorithm in the bi-label case, compared to a conventional global cut. The locations of deviations from the global labeling and their close ups are shown. The global cut is marked with the broad-dashed white lines, and the localized cut is marked with the white dotted line.

Figure 15A:
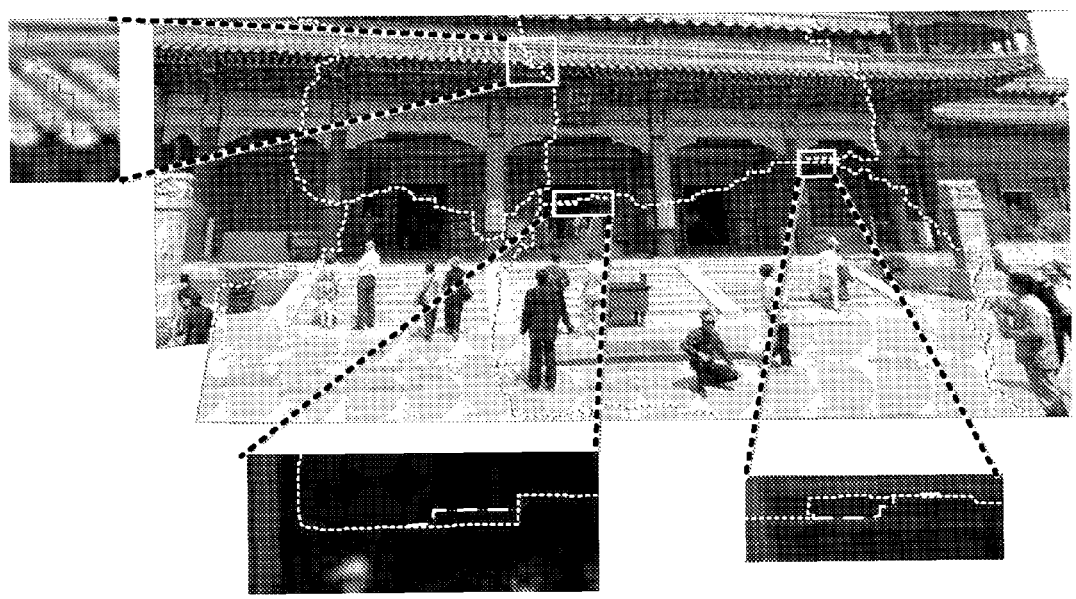
FIGS. 15A and 15B illustrate exemplary results of an embodiment of the hierarchical graph cut algorithm in the multi-label case.
Figure 15B:
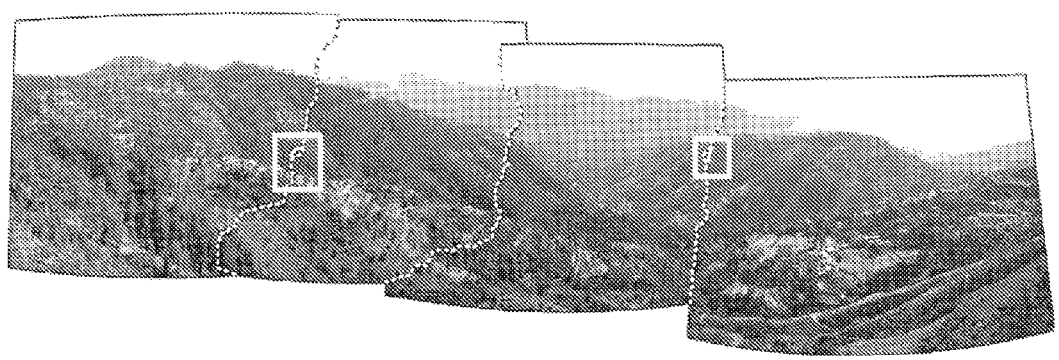

FIGS. 15A and 15B illustrate exemplary results of an embodiment of the hierarchical graph cut algorithm in the multi-label case, compared to a conventional global cut. The locations of deviations from the global labeling and their close ups are shown for FIG. 15A. Again, the global cut is marked with the broad-dashed white lines, and the localized cut is marked with the white dotted line.

In some embodiments of the localized hierarchical graph cut technique, performance may scale in proportion to the number of $L_2$ caches rather than the number of cores. This is because the max-flow algorithm is memory bound. If there are more threads than $L_2$ caches, there is too much memory contention and the performance degrades. However, on a compute cluster, this problem may be alleviated, and the performance may scale linearly.

Embodiments of the image segmentation technique described herein are parallelizable, and thus clusters and/or multi core machines may be utilized to improve performance. Embodiments may reduce memory usage when compared to conventional techniques, and may provide cache friendliness.

Embodiments of the image segmentation technique described herein may have application in speeding up Markov random field (MRF) energy minimization. The technique described above does not depend explicitly on the exact energy function or the fact that a graph cut algorithm is used. In various embodiments, the essential elements may be extracted, and other various MRF labeling schemes may be similarly parallelized.

Extension to the Non-Hierarchical Case

For the non-hierarchical case, a variation on the above localized hierarchical graph cut technique is described that yields good results under the assumption that the user provides only the foreground or the background in the form of sufficiently large and continuous strokes. These assumptions are satisfied in various interactive selection tools such as GrabCut and the Adobe Photoshop® Quick Select tool. A significant speed up (e.g., close to an order of magnitude) in this case may be observed as the number of vertices is significantly reduced.

The following describes a parallel solution to the graph cut based energy minimization problem that yields a close approximation to the global minimum. Embodiments may be used, for example, with the Adobe Photoshop® Quick Select tool. The approach taken in embodiments is to divide the image (or the region of interest) into subregions and solve the energy minimization problem locally for each subregion. Embodiments then attempt to string together the local solutions to get a solution that is close to the global minimum, or at least a solution that is useful.

Figure 16:
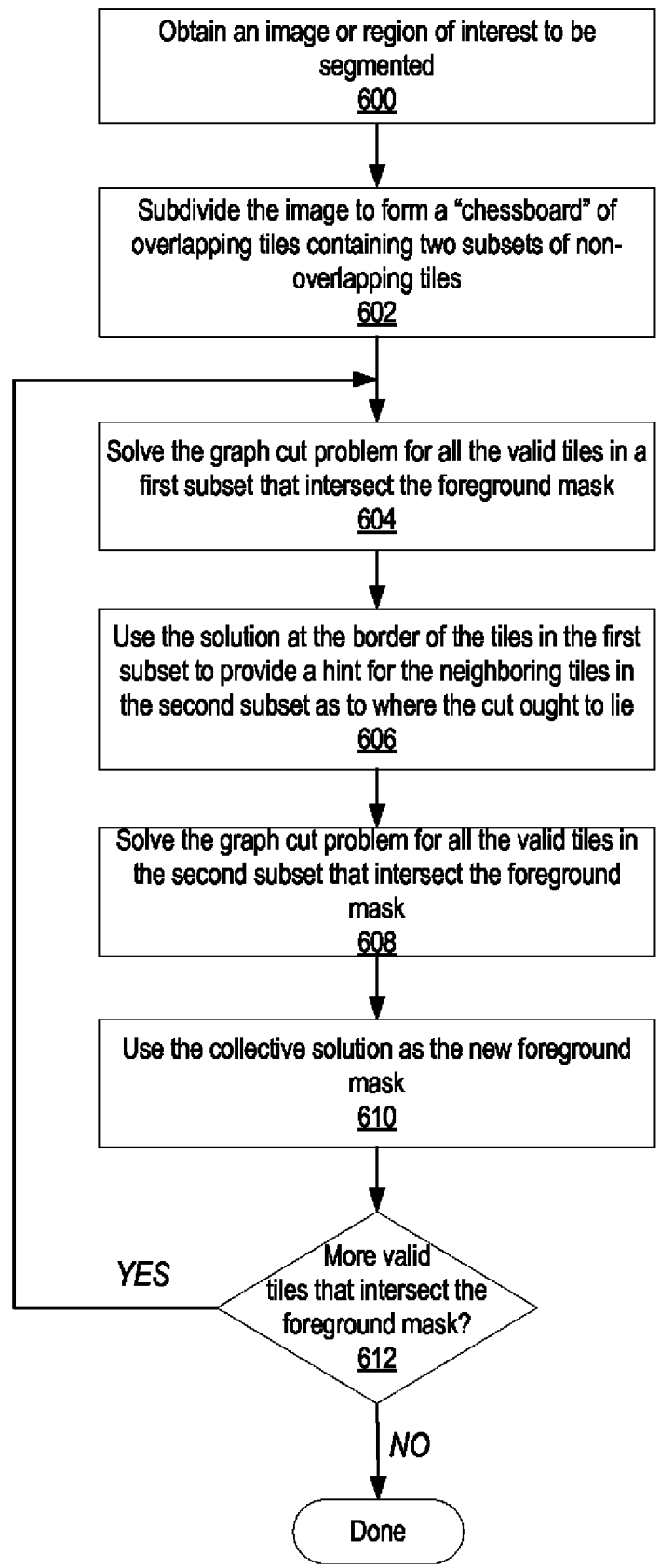
FIG. 16 is a flowchart of a method of growing a foreground mask for the non-hierarchical case, according to one embodiment.

Assume an image and a user specified foreground mask are given. Embodiments may attempt to grow the foreground mask to grab as much of the object as possible. FIG. 16 is a flowchart of a method of growing a foreground mask for the non-hierarchical case, according to one embodiment. As indicated at 600, an image or region of interest to be segmented is obtained. User input directing a desired image segmentation may also be obtained, as well as an initial foreground mask. As indicated at 602, the image is subdivided into overlapping tiles that overlap by one pixel in each direction. Note that, in some embodiments, the tiles may overlap by other numbers of pixels. In one embodiment, a color (e.g., black or white) or some other designation is assigned to each tile in the fashion of a chess board. Essentially, the method assigns two different colors (or other designators) to alternate tiles so that two adjacent tiles are not assigned the same color (designator), to thus form a "chess board" of tiles. Thus, the set tiles may be viewed as forming two subsets (e.g., a subset of non-overlapping black tiles and a set of non-overlapping white tiles). Note that, while the tiles in one subset do not overlap other tiles in that subset, the tiles in one subset do overlap tiles in the other subset. Initially, all tiles are tagged as valid. Other methods of distinguishing between two alternating sets of tiles may be used.

As indicated at 604, in a first pass, the graph cut problem is solved for all the valid tiles in a first subset (e.g., the "black" subset) that intersect the foreground mask. Tiles for which graph cut has been performed are tagged as invalid. As indicated at 606, since the tiles overlap, the solution at the border of the tiles in the first subset may be used to provide a hint for the neighboring tiles in the second subset as to where the cut ought to lie. In one embodiment, the hint may be given in the form of appropriate biases (t-link weights). In one embodiment, simply freezing the energies at the overlap based on the solution obtained may be used. As indicated at 608, the graph cut problem is solved for the tiles in the second subset that intersect the foreground mask. Tiles for which graph cut has been performed may be tagged as invalid. As indicated at 610, the collective solution that was obtained may now be used to generate a new foreground mask.

As indicated at 612, elements 604 through 610 are iterated until the foreground mask does not grow any more. That is, the method stops when it is found that there are no more valid tiles that intersect the foreground mask.

Preventing Leaks

Since small tiles are used and local solutions are obtained, there is a risk that the local solution might leak out of the actual foreground. Once a leak happens, it will start contaminating the neighboring tiles if they overlap, which may result in a poor solution. In fact, since the biases and the edge weights that are currently in use within the quick select tool are geared towards large images, there is a strong tendency to select the whole tile as the foreground.

One method to address the above problem is by tweaking the t-link weights so that the penalty for choosing a vertex as foreground is increased, but this may dampen the growth of the selection considerably. In one embodiment, to fix this problem, an extra set of vertices may be added around each tile. Each such extra vertex is fully biased towards the background. The interaction potential between the extra vertices and the actual tile vertices are set to an experimentally chosen small constant value. This ring of virtual background vertices encourages the min cut to reside inside the tile rather than flow out. If the minimum energy solution happens to be the whole tile, it will have to pay the penalty of the interaction potentials all around the tile edges.

The solution obtained from the above method is not guaranteed to be the same as the global minimum, but tends to stay within the object being selected. The selected area may tend to be slightly larger than the global solution. The method comes close to the global minimum in several cases, and in some cases actually obtains the global minimum.

The best results may be obtained when the foreground mask is a significantly large portion of the actual image. Based on this observation, one embodiment of the above method to solve the border graph problem refines the solution obtained at the lower resolution.

Due to the local nature of computation, cache misses may be minimized. The iterative nature of the method reduces the number of search paths. The results may vary on a case by case basis, but speed improvements of 2 to 8 or more times may be obtained. If each tile is processed in parallel on a multi core machine, additional speed improvements are possible.

There may be other approaches based on the idea of overlapping tiles. One possibility is to independently solve a white tile and a black tile that are adjacent. If the solutions agree on the overlapped region, the local solutions may be accepted. If there is a major discrepancy, the two tiles may be merged into one tile and solved. If the tiles that need to be corrected are few in number, there is a good chance that the method may result in the global solution. Another approach may be to keep the user specified foreground as it is, but keep changing the tiles in each iteration.

In one embodiment, improved results may be realized by creating a band around the boundary of the user-provided foreground or background, and covering the band with overlapping tiles.

Implementation

Figure 17:
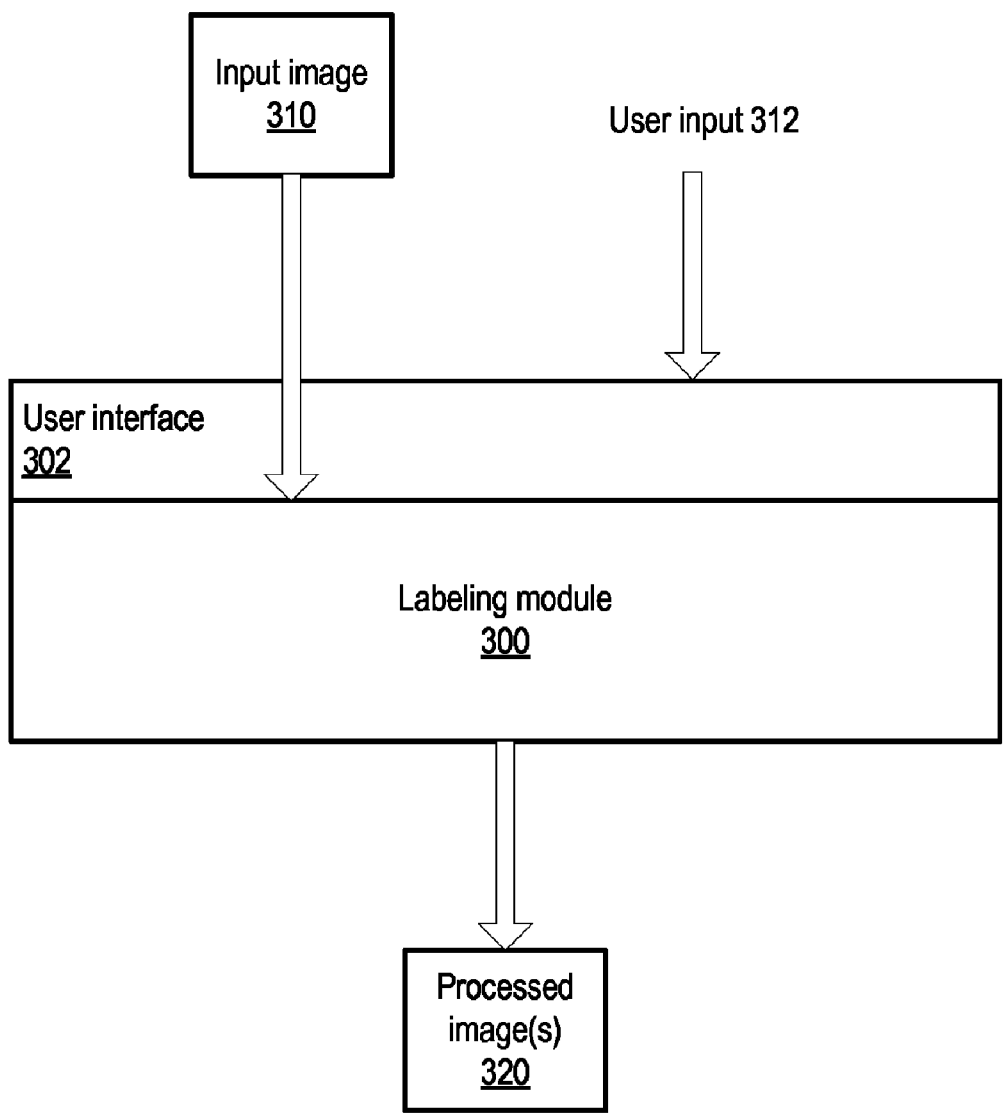
FIG. 17 illustrates an exemplary labeling module according to one embodiment.

FIG. 17 illustrates an exemplary module that may implement embodiments of the above-described techniques, e.g. one or more of the methods illustrated in FIGS. 8, 9, 10, 13 and 16. Embodiments of the methods for localized labeling in digital images as described herein, for example a graph cut labeling method, may be implemented as or in a labeling module 300 as illustrated in FIG. 17. Module 300 may provide a user interface 302 that includes one or more user tools via which a user may interact with, direct, and/or control the labeling process performed by module 300. Module 300 may obtain an image 310 or region of interest of an image and possibly user input 312 and perform a localized labeling function (e.g., localized graph cut labeling) of the image accordingly as described herein to produce processed image or images 320 (e.g., images segmented according to a localized graph cut labeling), and possibly other data regarding the localized labeling of the input image 310. In one embodiment, the original input image 310 may not be modified by the localized labeling process, but instead a new image or images 320 that incorporate the localized labeling performed by module 300 may be generated as output.

Module 300 may be implemented in a stand-alone application or as a module of a graphics application or graphics library that provides other graphical tools. Examples of graphics applications in which embodiments of module 300 may be implemented include, but are not limited to, scientific, medical, painting, publishing, digital photography, video editing, games, animation, and/or other applications in which digital image processing that utilize pixel labeling may be performed. Module 300 may be used in displaying, processing rendering, producing and/or storing (to a memory medium such as a storage device) an image, video, and/or other graphics output.

Exemplary System

Figure 18:
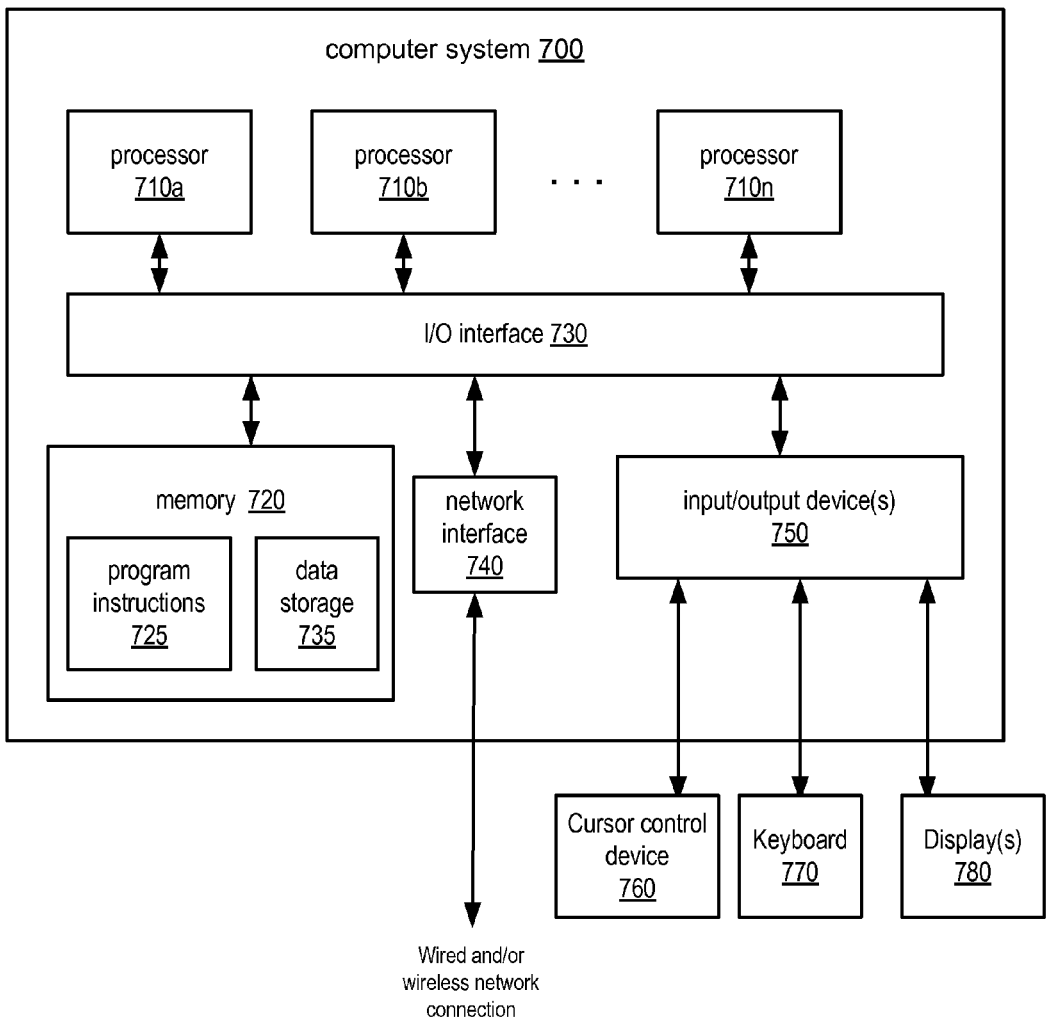
FIG. 18 illustrates an exemplary computer system that may be used in embodiments.

Various components of embodiments of a method for localized labeling in digital images may be executed on one or more computer systems, which may interact with various other devices. One such computer system is illustrated by FIG. 18. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a method for localized labeling in digital images, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 18, memory 720 may include program instructions 725, configured to implement embodiments of a method for localized labeling in digital images as described herein, and data storage 735, comprising various data accessible by program instructions 725. In one embodiment, program instructions 725 may include software elements of a method for localized labeling in digital images as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a method for localized labeling in digital images as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In addition to storage media or memory media, a computer-accessible medium may include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
obtaining a region of uncertainty in an image within which a global labeling solution for the image lies;
covering the region of uncertainty with a set of multiple overlapping tiles;
applying a labeling function to each tile in a first subset of the tiles to generate a local labeling for each of the tiles in the first subset; and
applying the labeling function to each tile in a second subset of the tiles to generate a local labeling for each of the tiles in the second subset, wherein the local labeling for a tile in the first subset is input as a boundary condition to the labeling function when applied to a tile in the second subset that overlaps the tile in the first subset; and
merging the local labelings for all of the tiles in all of the subsets to form a global labeling for the image.

2. The computer-implemented method as recited in claim 1, wherein said obtaining a region of uncertainty in an image comprises:

performing the labeling function on a lower-resolution version of the image to generate a low-resolution labeling; and upsampling the generated low-resolution labeling to the image to generate the region of uncertainty within which the global labeling solution for the image lies.

3. The computer-implemented method as recited in claim 1, wherein said covering the region of uncertainty with a set of multiple overlapping tiles comprises:

performing the labeling function on a lower-resolution version of the image to generate a low-resolution labeling;

covering a low-resolution region defined by the low-resolution labeling with a set of multiple overlapping low-resolution tiles; and upsampling the set of multiple overlapping low-resolution tiles to the image to generate the set of multiple overlapping tiles that cover the region of uncertainty in the image.

4. The computer-implemented method as recited in claim 3, wherein said covering a low-resolution region defined by the low-resolution labeling with a set of multiple overlapping low-resolution tiles comprises:

determining, from the low-resolution labeling, a set of border pixels that define a boundary in the low-resolution region;

traversing the boundary in the low-resolution region until a specified number of pixels with proper orthogonal slices in the low-resolution region have been accumulated;

determining a bounding box of the accumulated proper orthogonal slices, wherein the bounding box composes a respective one of the low-resolution tiles;

backtracking a specified distance on the boundary; and repeating said traversing, said setting, and said backtracking until the low-resolution region is covered with the low-resolution tiles.

5. The computer-implemented method as recited in claim 1, wherein the labeling function is a graph cut labeling function.

6. The computer-implemented method as recited in claim 1, wherein the labeling function is a Markov random field (MRF) labeling function.

7. The computer-implemented method as recited in claim 1, further comprising separating the set of multiple overlapping tiles into the first subset and the second subset, wherein the tiles in the first subset do not overlap other tiles in the first subset, wherein the tiles in the second subset do not overlap other tiles in the second subset, and wherein each tile in the second subset overlaps at least one tile in the first subset.

8. The computer-implemented method as recited in claim 1, wherein said separating the set of multiple overlapping tiles into the first subset and the second subset comprises applying a graph coloring algorithm to the set of multiple overlapping tiles.

9. The computer-implemented method as recited in claim 8, further comprising:

for each tile in the set of multiple overlapping tiles, determining a metric indicating a likelihood of the tile producing good localized labeling; and sorting the set of multiple overlapping tiles according to the metric to generate a sorted set of multiple overlapping tiles;

wherein the sorted set of multiple overlapping tiles is input to the graph coloring algorithm so that tiles with a higher likelihood of producing good localized labeling are placed in the first subset.

10. The computer-implemented method as recited in claim 9, wherein said determining a metric indicating a likelihood of the tile producing good localized labeling comprises determining a quantity $$\frac{k}{E}$$

for a lower-resolution version of the tile in a lower-resolution version of the image, wherein E is the energy of a cut in the lower-resolution version of the tile and k is the length of the cut in the lower-resolution version of the tile, and wherein the quantity $$\frac{k}{E}$$

for the lower-resolution version of the tile is used as the metric for the tile.

11. The computer-implemented method as recited in claim 9, wherein tiles for which the determined metric is below a specified likelihood threshold are placed in the second subset.

12. The computer-implemented method as recited in claim 1, wherein the labeling function is applied to at least two of the tiles in each subset in parallel.

13. The computer-implemented method as recited in claim 1, further comprising:

separating the set of multiple overlapping tiles into three or more subsets of tiles including the first subset and the second subset, wherein the tiles in a given subset do not overlap other tiles in the subset;

after said applying the labeling function to the tiles in the first subset and the tiles in the second subset, for each other subset, applying the labeling function to each tile in the other subset to generate a local labeling for each of the tiles in the other subset, wherein the local labeling for a tile in a previously processed subset is input as a boundary condition to the labeling function when applied to a tile in the other subset that overlaps the tile in the previously processed subset.

14. The computer-implemented method as recited in claim 1, further comprising excluding labels in the tiles in the first subset that are within a specified distance threshold of edges of the tiles from the boundary conditions.

15. The computer-implemented method as recited in claim 1, wherein the global labeling solution is a multi-label solution, the method further comprising:

determining a set of points in the region of uncertainty that present a bi-label problem and determining another set of points in the region of uncertainty that present a multi-label problem;

wherein said covering the region of uncertainty with a set of multiple overlapping tiles and said applying the labeling function to the tiles in the first subset and the tiles in the second subset are performed in accordance with the set of points that present a bi-label problem to generate local labelings for regions around the bi-label points;

applying a multi-label algorithm to the set of points that present a multi-label problem to generate local labelings for regions around the multi-label points; and merging the local labelings for regions around the bi-label points and the local labelings for regions around the multi-label points to form a global labeling for the image.

16. The computer-implemented method as recited in claim 15, wherein the multi-label algorithm is one of an α-expansion algorithm and an α-β swap algorithm.

17. The computer-implemented method as recited in claim 15, wherein said applying a multi-label algorithm to the set of points that present a multi-label problem is performed prior to said applying the labeling function on each tile in the subsets.

18. A system, comprising:
  at least one processor; and
  a memory storing program instructions, wherein the program instructions are executable by the at least one processor to:
    obtain a region of uncertainty in an image within which a global labeling solution for the image lies;
    cover the region of uncertainty with a set of multiple overlapping tiles;
    apply a labeling function to each tile in a first subset of the tiles to generate a local labeling for each of the tiles in the first subset; and
    apply the labeling function to each tile in a second subset of the tiles to generate a local labeling for each of the tiles in the second subset, wherein the local labeling for a tile in the first subset is input as a boundary condition to the labeling function when applied to a tile in the second subset that overlaps the tile in the first subset; and
    merge the local labelings for all of the tiles in all of the subsets to form a global labeling for the image.

19. The system as recited in claim 18, wherein, to obtain a region of uncertainty in an image, the program instructions are executable by the at least one processor to:
  perform the labeling function on a lower-resolution version of the image to generate a low-resolution labeling; and
  upsample the generated low-resolution labeling to the image to generate the region of uncertainty within which the global labeling solution for the image lies.

20. The system as recited in claim 18, wherein, to cover the region of uncertainty with a set of multiple overlapping tiles, the program instructions are executable by the at least one processor to:
  perform the labeling function on a lower-resolution version of the image to generate a low-resolution labeling;
  cover a low-resolution region defined by the low-resolution labeling with a set of multiple overlapping low-resolution tiles; and
  upsample the set of multiple overlapping low-resolution tiles to the image to generate the set of multiple overlapping tiles that cover the region of uncertainty in the image.

21. The system as recited in claim 18, wherein the labeling function is one of a graph cut labeling function and a Markov random field (MRF) labeling function.

22. The system as recited in claim 18, wherein the program instructions are executable by the at least one processor to separate the set of multiple overlapping tiles into the first subset and the second subset, wherein the tiles in the first subset do not overlap other tiles in the first subset, wherein the tiles in the second subset do not overlap other tiles in the second subset, and wherein each tile in the second subset overlaps at least one tile in the first subset.

23. The system as recited in claim 18, wherein the system is configured to apply the labeling function to at least two of the tiles in each subset in parallel.

24. The system as recited in claim 18, wherein the program instructions are executable by the at least one processor to:
  separate the set of multiple overlapping tiles into three or more subsets of tiles including the first subset and the second subset, wherein the tiles in a given subset do not overlap other tiles in the subset;
  after said applying the labeling function to the tiles in the first subset and the tiles in the second subset, for each other subset of tiles, apply the labeling function to each tile in the other subset to generate a local labeling for each of the tiles in the other subset, wherein the local labeling for a tile in a previously processed subset is input as a boundary condition to the labeling function when applied to a tile in the other subset that overlaps the tile in the previously processed subset.

25. The system as recited in claim 18, wherein the global labeling solution is a multi-label solution, and wherein the program instructions are executable by the at least one processor to:
  determine a set of points in the region of uncertainty that present a bi-label problem and determining another set of points in the region of uncertainty that present a multi-label problem;
  perform said covering the region of uncertainty with a set of multiple overlapping tiles and said applying the labeling function to the tiles in the first subset and the tiles in the second subset in accordance with the set of points that present a bi-label problem to generate local labelings for regions around the bi-label points;
  apply a multi-label algorithm to the set of points that present a multi-label problem to generate local labelings for regions around the multi-label points; and
  merge the local labelings for regions around the bi-label points and the local labelings for regions around the multi-label points to form a global labeling for the image.

26. The system as recited in claim 25, wherein the multi-label algorithm is one of an α-expansion algorithm and an α-β swap algorithm.

27. A computer-readable storage medium storing program instructions, wherein the program instructions are computer-executable to implement:
  obtaining a region of uncertainty in an image within which a global labeling solution for the image lies;
  covering the region of uncertainty with a set of multiple overlapping tiles;
  applying a labeling function to each tile in a first subset of the tiles to generate a local labeling for each of the tiles in the first subset; and
  applying the labeling function to each tile in a second subset of the tiles to generate a local labeling for each of the tiles in the second subset, wherein the local labeling for a tile in the first subset is input as a boundary condition to the labeling function when applied to a tile in the second subset that overlaps the tile in the first subset; and
  merging the local labelings for all of the tiles in all of the subsets to form a global labeling for the image.

28. The computer-readable storage medium as recited in claim 27, wherein, in said obtaining a region of uncertainty in an image, the program instructions are computer-executable to implement:
  performing the labeling function on a lower-resolution version of the image to generate a low-resolution labeling; and
  upsampling the generated low-resolution labeling to the image to generate the region of uncertainty within which the global labeling solution for the image lies.

29. The computer-readable storage medium as recited in claim 27, wherein, in said covering the region of uncertainty with a set of multiple overlapping tiles, the program instructions are computer-executable to implement:

performing the labeling function on a lower-resolution version of the image to generate a low-resolution labeling;
covering a low-resolution region defined by the low-resolution labeling with a set of multiple overlapping low-resolution tiles; and
upsampling the set of multiple overlapping low-resolution tiles to the image to generate the set of multiple overlapping tiles that cover the region of uncertainty in the image.

30. The computer-readable storage medium as recited in claim 27, wherein the labeling function is one of a graph cut labeling function and a Markov random field (MRF) labeling function.

31. The computer-readable storage medium as recited in claim 27, wherein the program instructions are computer-executable to implement separating the set of multiple overlapping tiles into the first subset and the second subset, wherein the tiles in the first subset do not overlap other tiles in the first subset, wherein the tiles in the second subset do not overlap other tiles in the second subset, and wherein each tile in the second subset overlaps at least one tile in the first subset.

32. The computer-readable storage medium as recited in claim 27, wherein the labeling function is applied to at least two of the tiles in each subset in parallel.

33. The computer-readable storage medium as recited in claim 27, wherein the program instructions are computer-executable to implement:
    separating the set of multiple overlapping tiles into three or more subsets of tiles including the first subset and the second subset, wherein the tiles in a given subset do not overlap other tiles in the subset;
    after said applying the labeling function to the tiles in the first subset and the tiles in the second subset, for each other subset, applying the labeling function to each tile in the other subset to generate a local labeling for each of the tiles in the other subset, wherein the local labeling for a tile in a previously processed subset is input as a boundary condition to the labeling function when applied to a tile in the other subset that overlaps the tile in the previously processed subset.

34. The computer-readable storage medium as recited in claim 27, wherein the global labeling solution is a multi-label solution, and wherein the program instructions are computer-executable to implement:
    determining a set of points in the region of uncertainty that present a bi-label problem and determining another set of points in the region of uncertainty that present a multi-label problem;
    wherein said covering the region of uncertainty with a set of multiple overlapping tiles and said applying the labeling function to the tiles in the first subset and the tiles in the second subset are performed in accordance with the set of points that present a bi-label problem to generate local labelings for regions around the bi-label points;
    applying a multi-label algorithm to the set of points that present a multi-label problem to generate local labelings for regions around the multi-label points; and
    merging the local labelings for regions around the bi-label points and the local labelings for regions around the multi-label points to form a global labeling for the image.

35. The computer-readable storage medium as recited in claim 34, wherein the multi-label algorithm is one of an $\alpha$-expansion algorithm and an $\alpha$-$\beta$ swap algorithm.

36. A computer-implemented method, comprising:
    obtaining an image on which a labeling function is to be applied and a current foreground mask for the labeling function;
    covering the image with overlapping tiles and initializing all the tiles as valid tiles;
    assigning one of two different designations to alternating tiles so that no two adjacent tiles are assigned the same designation; and
    iteratively applying the labeling function to valid tiles of a first of the two designations and to valid tiles of a second of the two designations to generate a global labeling solution for the image, wherein applying the labeling function to valid tiles of a second of the two designations comprises inputting the local labeling for a tile of the first designation as a boundary condition to the labeling function when applied to a tile of the second designation that overlaps the tile of the first designation.

37. The computer-implemented method as recited in claim 36, wherein said iteratively applying the labeling function to valid tiles of the first designation and to valid tiles of the second designations to generate a global labeling solution for the image comprises:
    repeating:
        applying the labeling function to all valid tiles of the first of the two designations that intersect the current foreground mask to generate local labelings for the valid tiles of the first designation;
        applying the labeling function to all valid tiles of the second of the two designations that intersect the current foreground mask to generate local labelings for the valid tiles of the second designation, wherein the local labeling for a tile of the first designation is input as a boundary condition to the labeling function when applied to a tile of the second designation that overlaps the tile of the first designation;
        merging the local labelings of the valid tiles of the first designation and the local labelings of the valid tiles of the second designation to form a collective labeling;
        setting all the valid tiles to which the labeling function was applied to invalid; and
        generating, from the collective labeling, a new foreground mask as the current foreground mask;
    until there are no more valid tiles that intersect the foreground mask; and
    outputting the final collective labeling as the global labeling solution for the image.

38. The computer-implemented method as recited in claim 36, wherein the labeling function is a graph cut labeling function.

39. The computer-implemented method as recited in claim 36, wherein the labeling function is applied to at least two of the tiles in parallel.

40. A system, comprising:
    at least one processor; and
    a memory storing program instructions, wherein the program instructions are executable by the at least one processor to:
        obtain an image on which a labeling function is to be applied and a current foreground mask for the labeling function;
        cover the image with overlapping tiles and initializing all the tiles as valid tiles;
        assign one of two different designations to alternating tiles so that no two adjacent tiles are assigned the same designation; and iteratively apply the labeling function to valid tiles of a first of the two designations and to valid tiles of a second of the two designations to generate a global labeling solution for the image, wherein applying the labeling function to valid tiles of a second of the two designations comprises inputting the local labeling for a tile of the first designation as a boundary condition to the labeling function when applied to a tile of the second designation that overlaps the tile of the first designation.

41. The system as recited in claim 40, wherein, to iteratively apply the labeling function to valid tiles of the first designation and to valid tiles of the second designations to generate a global labeling solution for the image, the program instructions are executable by the at least one processor to:
repeat:
apply the labeling function to all valid tiles of the first of the two designations that intersect the current foreground mask to generate local labelings for the valid tiles of the first designation;
apply the labeling function to all valid tiles of the second of the two designations that intersect the current foreground mask to generate local labelings for the valid tiles of the second designation, wherein the local labeling for a tile of the first designation is input as a boundary condition to the labeling function when applied to a tile of the second designation that overlaps the tile of the first designation;
merge the local labelings of the valid tiles of the first designation and the local labelings of the valid tiles of the second designation to form a collective labeling;
set all the valid tiles to which the labeling function was applied to invalid; and
generate, from the collective labeling, a new foreground mask as the current foreground mask;
until there are no more valid tiles that intersect the foreground mask; and
output the final collective labeling as the global labeling solution for the image.

42. The system as recited in claim 40, wherein the labeling function is a graph cut labeling function.

43. The system as recited in claim 40, wherein the system is configured to apply the labeling function to at least two of the tiles in parallel.

44. A computer-readable storage medium storing program instructions, wherein the program instructions are computer-executable to implement:
obtaining an image on which a labeling function is to be applied and a current foreground mask for the labeling function;
covering the image with overlapping tiles and initializing all the tiles as valid tiles;
assigning one of two different designations to alternating tiles so that no two adjacent tiles are assigned the same designation; and
iteratively applying the labeling function to valid tiles of a first of the two designations and to valid tiles of a second of the two designations to generate a global labeling solution for the image, wherein applying the labeling function to valid tiles of a second of the two designations comprises inputting the local labeling for a tile of the first designation as a boundary condition to the labeling function when applied to a tile of the second designation that overlaps the tile of the first designation.

45. The computer-readable storage medium as recited in claim 44, wherein, in said iteratively applying the labeling function to valid tiles of the first designation and to valid tiles of the second designations to generate a global labeling solution for the image, the program instructions are computer-executable to implement:
repeating:
applying the labeling function to all valid tiles of the first of the two designations that intersect the current foreground mask to generate local labelings for the valid tiles of the first designation;
applying the labeling function to all valid tiles of the second of the two designations that intersect the current foreground mask to generate local labelings for the valid tiles of the second designation, wherein the local labeling for a tile of the first designation is input as a boundary condition to the labeling function when applied to a tile of the second designation that overlaps the tile of the first designation;
merging the local labelings of the valid tiles of the first designation and the local labelings of the valid tiles of the second designation to form a collective labeling;
setting all the valid tiles to which the labeling function was applied to invalid; and
generating, from the collective labeling, a new foreground mask as the current foreground mask;
until there are no more valid tiles that intersect the foreground mask; and
outputting the final collective labeling as the global labeling solution for the image.

46. The computer-readable storage medium as recited in claim 44, wherein the labeling function is a graph cut labeling function.

47. The computer-readable storage medium as recited in claim 44, wherein the program instructions are computer-executable to implement applying the labeling function to at least two of the tiles in parallel.

* * * * *